US011921445B2

(12) United States Patent
Yamashita et al.

(10) Patent No.: US 11,921,445 B2
(45) Date of Patent: Mar. 5, 2024

(54) TRANSPORT DEVICE, FIXING DEVICE, AND IMAGE FORMING APPARATUS

(71) Applicant: FUJIFILM Business Innovation Corp., Tokyo (JP)

(72) Inventors: Masato Yamashita, Kanagawa (JP); Yoshiki Shimodaira, Kanagawa (JP); Kosuke Yamada, Kanagawa (JP); Tetsuro Kodera, Kanagawa (JP); Mitsuhiro Matsumoto, Kanagawa (JP); Takayuki Yamashita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/541,270

(22) Filed: Dec. 3, 2021

(65) Prior Publication Data

US 2023/0063255 A1 Mar. 2, 2023

(30) Foreign Application Priority Data

Aug. 25, 2021 (JP) ................................ 2021-137613

(51) Int. Cl.
*G03G 15/20* (2006.01)

(52) U.S. Cl.
CPC ................................ *G03G 15/2028* (2013.01)

(58) Field of Classification Search
CPC .................................................. G03G 15/2028
See application file for complete search history.

(56) References Cited

U.S. PATENT DOCUMENTS 11,385,577 B2 7/2022 Kodera et al.
2006/0056886 A1* 3/2006 Ohishi .................. B41J 13/025 399/328
2018/0004131 A1* 1/2018 Oikawa ............. G03G 15/2064
(Continued)

FOREIGN PATENT DOCUMENTS

EP 1642739 4/2006
JP S5368243 6/1978
(Continued)

OTHER PUBLICATIONS

JP_2017076079_A_I MachineTranslation, Japan, 2017, Mito et al.*
(Continued)

*Primary Examiner* — Victor Verbitsky
(74) *Attorney, Agent, or Firm* — JCIPRNET

(57) ABSTRACT

A transport device includes: a first transport body; a second transport body that is movable between a contact position and a separate position with respect to the first transport body and that nips a transported material with the first transport body at the contact position; and a transport section that includes a holder to hold a leading end portion of the transported material and that transports the transported material toward a nip region where the first transport body and the second transport body nip the transported material in a state in which the second transport body is located at the separate position. After holding of the leading end portion by the holder for the transported material transported by the transport section has been released, the second transport body nips the transported material with the first transport body and transports the transported material.

20 Claims, 16 Drawing Sheets

(56) References Cited

U.S. PATENT DOCUMENTS

| | | | |
|---|---|---|---|
| 2022/0075303 | A1 | 3/2022 | Shimodaira et al. |
| 2022/0082967 | A1 | 3/2022 | Yamashita et al. |

FOREIGN PATENT DOCUMENTS

| | | | | | |
|---|---|---|---|---|---|
| JP | 2006259223 | | | 9/2006 | |
| JP | 2007078787 | | | 3/2007 | |
| JP | 2012045468 | | | 3/2012 | |
| JP | 2017076079 | A | * | 4/2017 | |
| JP | 6229700 | B2 | * | 11/2017 | ......... G03G 15/2032 |
| WO | 2020183756 | | | 9/2020 | |
| WO | 2020255461 | | | 12/2020 | |
| WO | 2020261614 | | | 12/2020 | |

OTHER PUBLICATIONS

JP_6229700_B2_I Machine Translation, Saito, Japan, Nov. 2017.*
"Search Report of Europe Counterpart Application", dated Aug. 8, 2022, p. 1-p.10.
"Office Action of Australia Counterpart Application", dated Jun. 28, 2023, pp. 1-4.

* cited by examiner

TRANSPORT DEVICE, FIXING DEVICE, AND IMAGE FORMING APPARATUS

CROSS-REFERENCE TO RELATED APPLICATIONS

This application is based on and claims priority under 35 USC 119 from Japanese Patent Application No. 2021-137613 filed Aug. 25, 2021.

BACKGROUND

(i) Technical Field

The present disclosure relates to a transport device, a fixing device, and an image forming apparatus.

(ii) Related Art

Japanese Unexamined Patent Application Publication No. 2006-259223 discloses a fixing device that fixes an image drawn on a recording medium to the recording medium by using particles containing at least a resin. The fixing device includes a fixing roller pair, an adhesive portion, a charging portion, and a fixing portion. The fixing roller pair includes a first fixing roller and a second fixing roller disposed to be paired with the first fixing roller. At least one of the first and second fixing rollers is a heating roller. A surface layer of at least one of the first and second fixing rollers is exchangeable. The adhesive portion includes an adhesive member to which the recording medium adheres. The charging portion charges at least one of the recording medium and the adhesive portion. The fixing portion physically fixes a leading end portion in a transport direction of the recording medium to a predetermined position of the adhesive portion by a holder. After the charging portion causes the adhesive member and the recording medium with the image drawn to be electrostatically attracted to each other and the fixing portion fixes the leading end portion of the recording medium with the image drawn to the predetermined position of the adhesive member, the fixing roller pair nips and transports the recording medium together with the adhesive portion to fix the image onto the recording medium.

SUMMARY

In a configuration in which a transport section that holds and transports a leading end portion of a transported material transports the transported material while a first transport body and a second transport body nip the transported material, a wrinkle may be generated on the transported material.

Aspects of non-limiting embodiments of the present disclosure relate to suppressing generation of a wrinkle on a transported material as compared with the configuration in which the transport section that holds and transports the leading end portion of the transported material transports the transported material while the first transport body and the second transport body nip the transported material.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a transport device including: a first transport body; a second transport body that is movable between a contact position and a separate position with respect to the first transport body and that nips a transported material with the first transport body at the contact position; and a transport section that includes a holder to hold a leading end portion of the transported material and that transports the transported material toward a nip region where the first transport body and the second transport body nip the transported material in a state in which the second transport body is located at the separate position, wherein after holding of the leading end portion by the holder for the transported material transported by the transport section has been released, the second transport body nips the transported material with the first transport body and transports the transported material.

BRIEF DESCRIPTION OF THE DRAWINGS

Exemplary embodiments of the present disclosure will be described in detail based on the following figures, wherein.

DETAILED DESCRIPTION

Hereinafter, exemplary embodiments according to the present disclosure will be described with reference to the drawings.

First Exemplary Embodiment

Image Forming Apparatus 10

Figure 1:
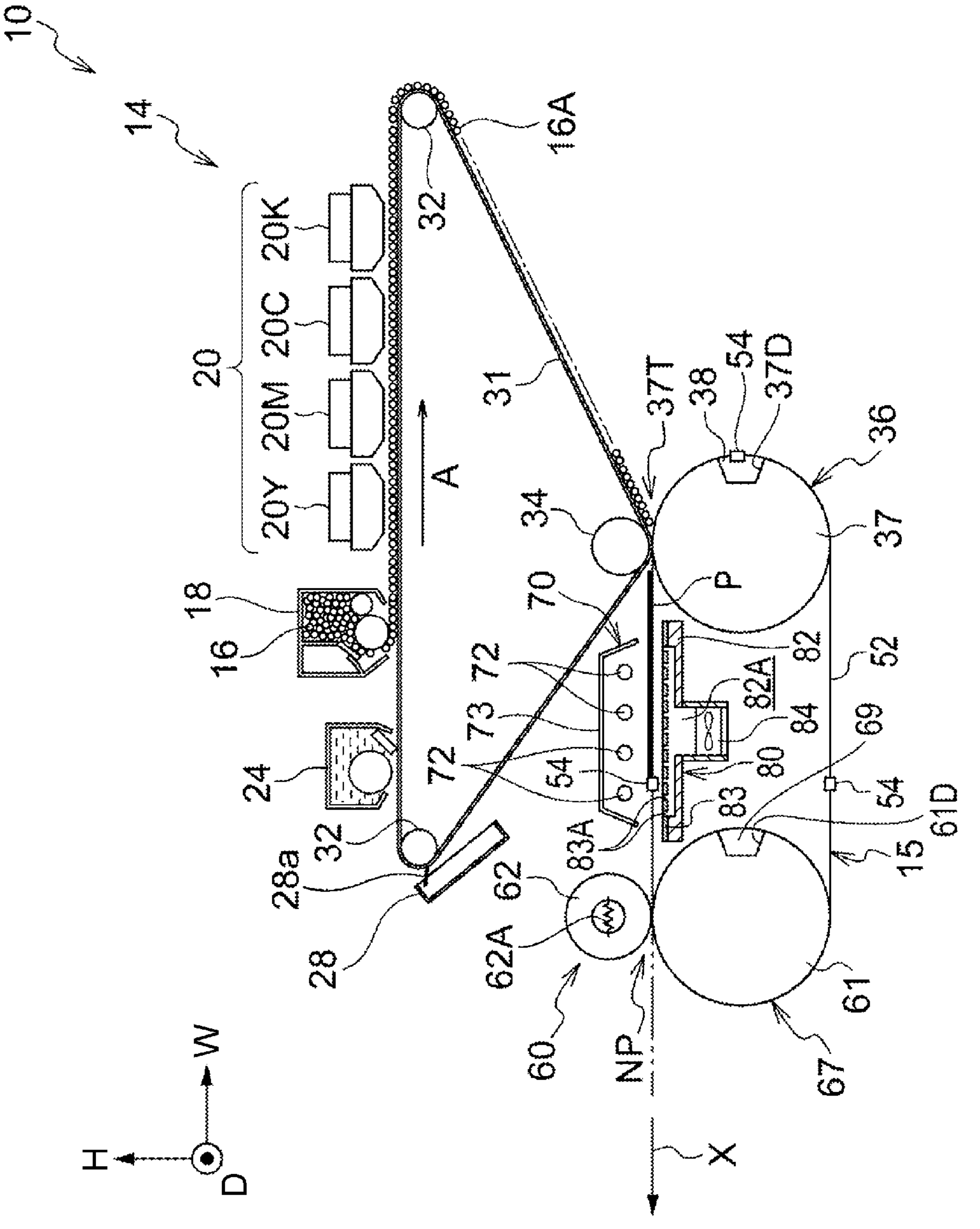
FIG. 1 is a schematic view illustrating a configuration of an image forming apparatus according to a first exemplary embodiment.

First, a configuration of an image forming apparatus 10 according to a first exemplary embodiment will be described. FIG. 1 is a schematic view illustrating the configuration of the image forming apparatus 10 according to the first exemplary embodiment. In the drawings, arrow H indicates a vertical direction that is an apparatus up-down direction, arrow W indicates a horizontal direction that is an apparatus width direction, and arrow D indicates an apparatus front-rear direction (apparatus depth direction). The dimensional ratios of the portions in the H direction, the W direction, and the D direction illustrated in the drawings may be different from the actual dimensional ratios.

The image forming apparatus 10 illustrated in FIG. 1 is an example of an image forming apparatus that forms an image on a recording medium. Specifically, the image forming apparatus 10 is an inkjet image forming apparatus that forms an ink image on a recording medium P. The recording medium P is an example of a transported material, and the ink image is an example of an image.

More specifically, the image forming apparatus 10 includes an image forming section 14 and a fixing device 60. Hereinafter, the respective components (the image forming section 14 and the fixing device 60) of the image forming apparatus 10 will be described.

Image Forming Section 14

The image forming section 14 has a function of forming an ink image on a recording medium P. Specifically, the image forming section 14 includes a transfer belt 31 as an intermediate transfer body, multiple rollers 32, a counter roller 34, an adhesive-layer forming device 24, a particle supply device 18, an ejection head 20, a transfer body 36, and a cleaner 28.

As illustrated in FIG. 1, the transfer belt 31 has an endless shape and is wound around the multiple rollers 32 and the counter roller 34 so as to have an inverted triangular posture in a front view (that is, when viewed in the apparatus depth direction). The transfer belt 31 circulates in a direction of arrow A as at least one of the multiple rollers 32 is driven to rotate.

The adhesive-layer forming device 24, the particle supply device 18, the ejection head 20, the transfer body 36, and the cleaner 28 are disposed in this order on an outer peripheral portion of the transfer belt 31 along a circulation direction of the transfer belt 31 (hereinafter referred to as "belt circulation direction").

Specifically, the adhesive-layer forming device 24 is disposed at an end portion on one side (left side in the drawing) in the apparatus width direction on a horizontal portion of the transfer belt 31 having the inverted triangular posture. The adhesive-layer forming device 24 houses an adhesive therein, and forms an adhesive layer (not illustrated) by applying the adhesive to an outer peripheral surface of the circulating transfer belt 31. As the adhesive, for example, a glue or an organic solvent is used.

The particle supply device 18 is disposed on a downstream side (right side in the drawing) in the belt circulation direction with respect to the adhesive-layer forming device 24 on the horizontal portion of the transfer belt 31. The particle supply device 18 houses therein ink receptive particles 16 capable of receiving ink droplets, and supplies the ink receptive particles 16 to the transfer belt 31 with the adhesive layer formed. Consequently, the ink receptive particles 16 supplied to the transfer belt 31 by the particle supply device 18 adhere to the adhesive layer by an adhesive force of the adhesive layer, and an ink-receptive-particle layer 16A is formed on the transfer belt 31.

The ejection head 20 is disposed on a downstream side (right side in the drawing) in the belt circulation direction with respect to the particle supply device 18 on the horizontal portion of the transfer belt 31. Multiple ejection heads 20 are provided so as to form ink images for respective colors. In the present exemplary embodiment, the ejection heads 20 for four colors in total of yellow (Y), magenta (M), cyan (C), and black (K) are provided. The Y, M, C, and K in FIG. 1 indicate components corresponding to the respective colors.

With the ejection heads 20 of the respective colors, ink droplets are ejected from nozzles (not illustrated) onto the ink-receptive-particle layer 16A by a known method such as a thermal method or a piezoelectric method to form an ink image based on image data. The ink droplets ejected from the ejection heads 20 of the respective colors are received by the ink-receptive-particle layer 16A, and an ink image is formed.

Figure 2:
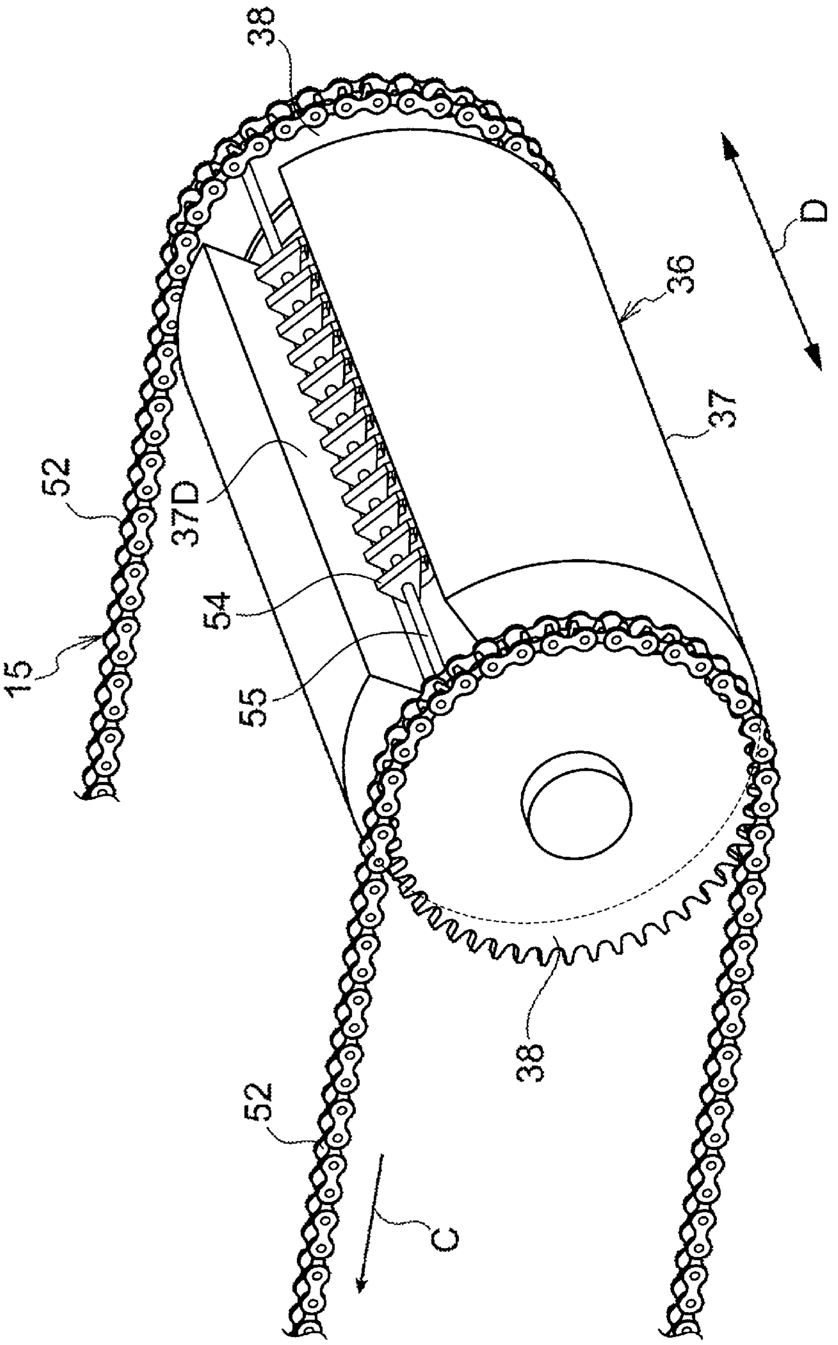
FIG. 2 is a perspective view illustrating a configuration of a transfer body according to the first exemplary embodiment.

The transfer body 36 is disposed on a lower side with respect to the transfer belt 31. Specifically, as illustrated in FIG. 2, the transfer body 36 includes a transfer cylinder 37 and a pair of sprockets 38. The transfer cylinder 37 is disposed to face the transfer belt 31, and forms a nip region 37T (see FIG. 1) where the transfer cylinder 37 and the counter roller 34 nip the transfer belt 31.

In the present exemplary embodiment, the ink image formed on the ink-receptive-particle layer 16A is transported to the nip region 37T by circulating of the transfer belt 31, and a recording medium P is transported to the nip region 37T by a transport section 15. In each drawing, a transport direction of the recording medium P is indicated by arrow X.

Then, the transfer cylinder 37 transfers the ink image onto the recording medium P by nipping and pressing the recording medium P transported to the nip region 37T and the ink image, with the transfer belt 31.

When the recording medium P and the ink image are nipped and pressed by the transfer cylinder 37 and the transfer belt 31 at the nip region 37T, the recording medium P and the ink image may be heated by the transfer cylinder 37. A recessed portion 37D is formed in the outer periphery of the transfer cylinder 37 to house a gripper 54 and an attachment member 55, which will be described later.

As illustrated in FIG. 2, the pair of sprockets 38 are disposed on both sides in an axial direction of the transfer cylinder 37. The pair of sprockets 38 are disposed coaxially with the transfer cylinder 37, and rotate together with the transfer cylinder 37. The transfer body 36 is driven to rotate by a driver (not illustrated). Chains 52 described later are wound around the pair of sprockets 38.

As illustrated in FIG. 1, the cleaner 28 is disposed on a downstream side in the belt circulation direction with respect to the nip region 37T and on an upstream side in the belt circulation direction with respect to the adhesive-layer forming device 24. The cleaner 28 includes a blade 28*a* in contact with the outer peripheral surface of the transfer belt 31. The cleaner 28 removes the adhesive layer, the ink receptive particles 16, the ink, and other foreign substances (for example, paper dust in a case where the recording medium P is paper) remaining on the portion of the transfer belt 31 that has passed through the nip region 37T along with the circulation of the transfer belt 31 using the blade 28*a*.

Fixing Device 60

The fixing device 60 illustrated in FIG. 1 is a device that fixes the ink image transferred on the recording medium P to the recording medium P, and is an example of a transport device. Specifically, as illustrated in FIG. 1, the fixing device 60 includes a pressing body 67, a heating roller 62, a heating unit 70, a blower unit 80, and a transport section 15.

Pressing Body 67 and Heating Roller 62

Figure 3:
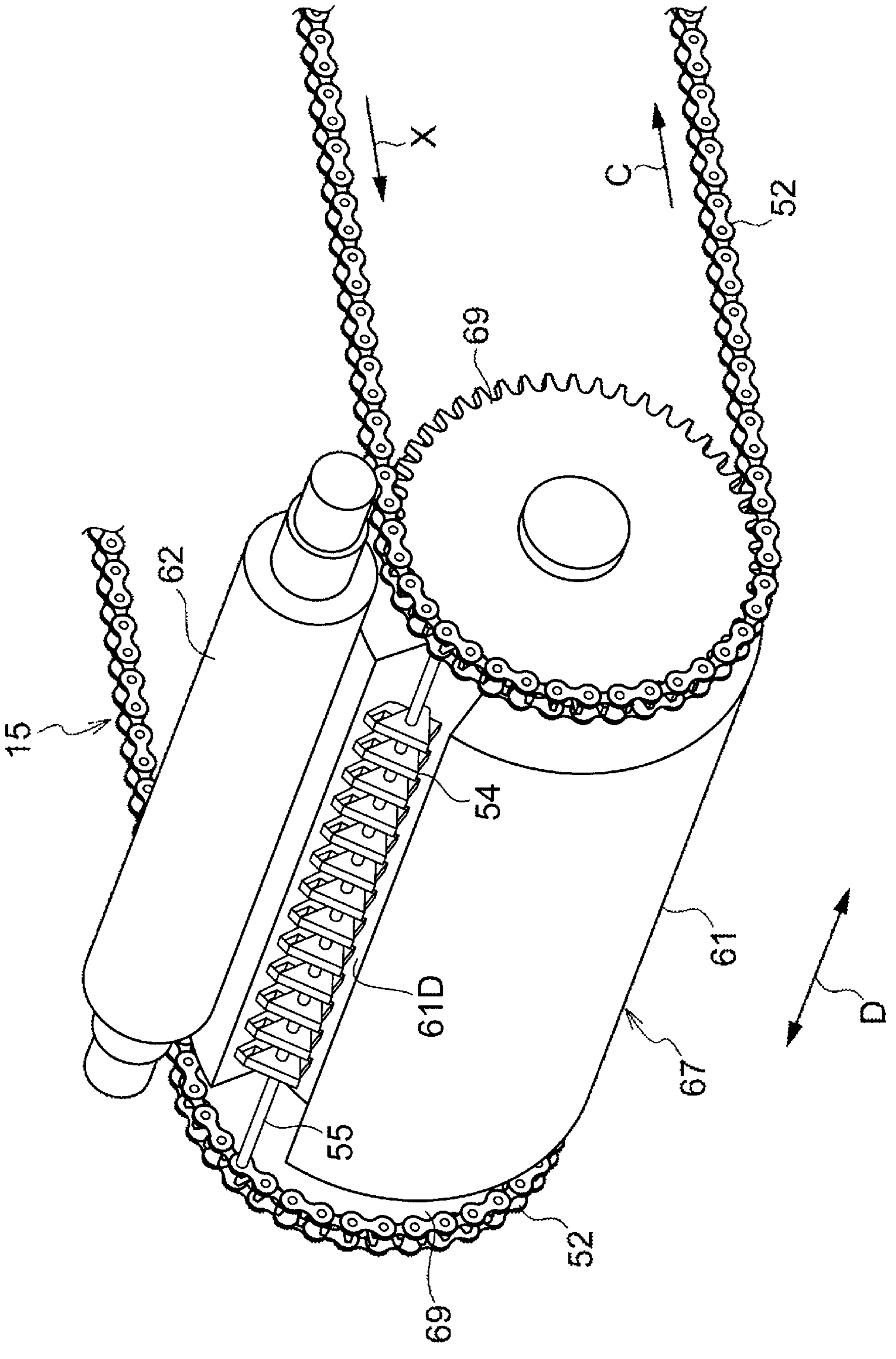
FIG. 3 is a perspective view illustrating a configuration of a fixing device according to the first exemplary embodiment.

As illustrated in FIG. 3, the pressing body 67 includes a pressing roller 61 and a pair of sprockets 69. The pair of sprockets 69 are disposed on both end sides in an axial direction of the pressing roller 61. The pair of sprockets 69 are disposed coaxially with the pressing roller 61 and are configured to rotate together with the pressing roller 61. Chains 52 described later are wound around the pair of sprockets 69.

Figure 5:
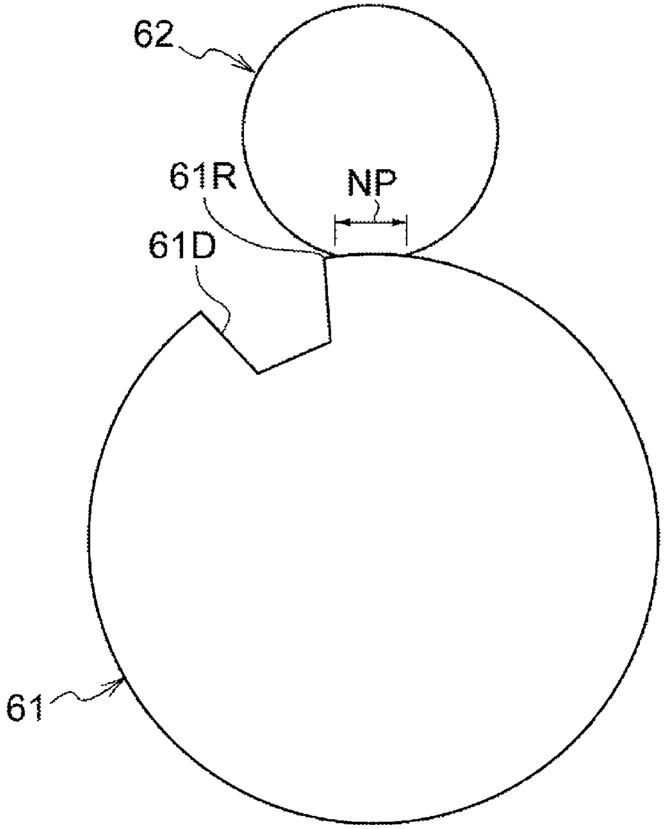
FIG. 5 is a schematic view illustrating a configuration of a pressing roller and a heating roller according to the first exemplary embodiment.

As illustrated in FIGS. 1 and 5, the pressing roller 61 and the heating roller 62 are disposed next to each other in the vertical direction. Specifically, the heating roller 62 is disposed on the upper side with respect to the pressing roller 61. The heating roller 62 has a heating source 62A (see FIG. 1) such as a halogen lamp in the heating roller 62.

In the present exemplary embodiment, for example, one of the pressing roller 61 and the heating roller 62 is driven to rotate, and the other of the pressing roller 61 and the heating roller 62 is rotated. Alternatively, both the pressing roller 61 and the heating roller 62 may be driven to rotate.

The heating roller 62 is movable between a contact position (position illustrated in FIG. 5) and a separate position (position illustrated in FIG. 6) with respect to the pressing roller 61. Specifically, the heating roller 62 is moved to the contact position (position illustrated in FIG. 5) and the separate position (position illustrated in FIG. 6) by a moving mechanism (hereinafter, referred to as moving mechanism) using a cam and so forth. That is, the heating roller 62 is pushed or pulled to the contact position by an elastic force of an elastic member (for example, a spring or the like) of the moving mechanism, and moved to the separate position by the cam of the moving mechanism against the elastic force.

Figure 10:
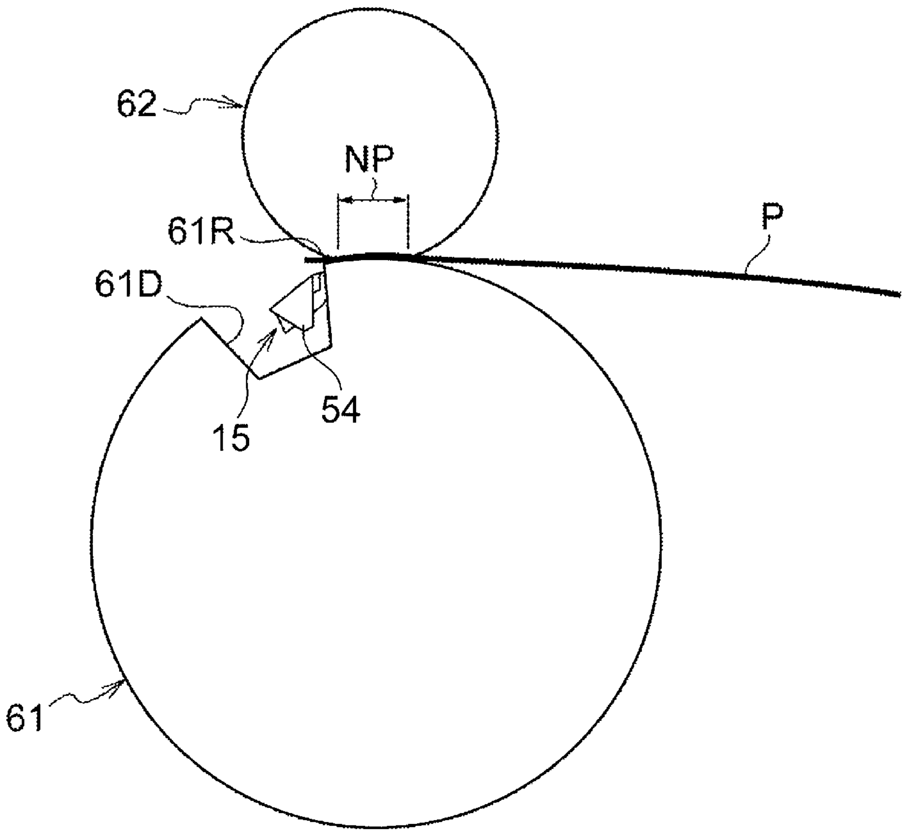
FIG. 10 is a schematic view illustrating a state in which the heating roller and the pressing roller nip the recording medium of which holding of the leading end portion has been released, in the configuration illustrated in FIG. 9.

As illustrated in FIG. 10, the heating roller 62 nips a recording medium P with the pressing roller 61 at the contact position. In each drawing, a nip region where the pressing roller 61 and the heating roller 62 nip a recording medium P is indicated by reference sign NP. The nip region NP is a region having a width in the transport direction X. Further, as will be described later, since the recording medium P transported to the nip region NP is nipped by the pressing roller 61 and the heating roller 62 in the nip region NP, the nip region NP may be also referred to as a place where nipping by the pressing roller 61 and the heating roller 62 is expected.

A recessed portion 61D is formed in the outer periphery of the pressing roller 61 to house a gripper 54 and an attachment member 55, which will be described later. The recessed portion 61D is open radially outward of the pressing roller 61. A corner portion 61R (hereinafter, referred to as a rear edge 61R) is formed at an upstream end of the recessed portion 61D of the pressing roller 61 in a rotation direction of the pressing roller 61. The rear edge 61R is formed in a shape with a rounded corner (round shape).

In the present exemplary embodiment, the pressing roller 61 is an example of a first transport body and an example of a pressing member. The heating roller 62 is an example of a second transport body and an example of a heating member.

Heating Unit 70

The heating unit 70 illustrated in FIG. 1 has a function of heating the recording medium P transported in the transport direction X by the transport section 15 in a non-contact manner. The heating unit 70 is disposed on an upstream side (right side in FIG. 1) in the transport direction with respect to the heating roller 62. Accordingly, the heating unit 70 heats the unfixed toner image formed on the surface of the recording medium P in a non-contact manner before the heating roller 62. Specifically, as illustrated in FIG. 1, the heating unit 70 includes a heater 72 and a reflecting plate 73.

The heater 72 is a heating member that heats the recording medium P transported in the transport direction X by the transport section 15, in a non-contact manner with respect to the recording medium P. More specifically, the heater 72 is configured as follows. That is, as illustrated in FIG. 1, multiple heaters 72 are disposed at an interval in the transport direction X. Each heater 72 is constituted by a columnar infrared heater having a length in the apparatus depth direction D. In the heater 72, a filament (not illustrated) provided therein generates heat, and the recording medium P is heated by the radiant heat of the filament. While four heaters 72 are provided in the present exemplary embodiment as illustrated in FIG. 1, the number of the heaters 72 is not limited to four.

The reflecting plate 73 has a function of reflecting infrared rays from the heater 72 toward an apparatus lower side (that is, toward the recording medium P transported by the transport section 15). Specifically, the reflecting plate 73 is formed in a box shape whose apparatus lower side is open. The reflecting plate 73 is formed using, for example, a metal plate such as an aluminum plate.

Blower Unit 80

The blower unit 80 illustrated in FIG. 1 faces the heating unit 70 on a side (that is, a lower side) opposite to the heating unit 70 side (that is, an upper side) with respect to the recording medium P transported by the transport section 15. The blower unit 80 is an example of a supporter.

The blower unit 80 has a function of blowing air to the lower surface of the recording medium P transported by the transport section 15. Specifically, the blower unit 80 has a function of, while the back surface of the recording medium P opposite to the front surface with the unfixed image formed is in a non-contact state, floating the recording medium P by blowing air to the recording medium P and maintaining the non-contact state so that the recording medium P is transported by the transport section 15.

In the present exemplary embodiment, the blower unit 80 includes a body part 82, a blower plate 83, and a blower 84. The body part 82 has therein a space 82A that opens upward.

The blower 84 is provided at a lower portion of the body part 82. The blower 84 sends air to the space 82A of the body part 82. As the blower 84, for example, an axial blower that blows air in an axial direction thereof is used. Alternatively, a centrifugal blower that blows air in a centrifugal direction, such as a multiblade blower (for example, a sirocco fan), may be used as the blower 84.

The blower plate 83 is provided at an upper portion of the body part 82 so as to close the opening of the body part 82. The blower plate 83 faces the heating unit 70 on the side (that is, the lower side) opposite to the heating unit 70 side (that is, the upper side) with respect to the recording medium P transported by the transport section 15. Further, the blower plate 83 is a plate-shaped member made of metal or resin and has multiple blower holes 83A extending through the blower plate 83 in the up-down direction H. The blower plate 83 supports the recording medium P by causing air sent from the blower 84 to the space 82A of the body part 82 to pass upward through the multiple blower holes 83A and to hit the lower surface of the recording medium P, thereby floating the recording medium P.

Transport Section 15

The transport section 15 illustrated in FIG. 1 has a function of transporting the recording medium P and passing the recording medium P through the nip region 37T and the nip region NP. As illustrated in FIGS. 1, 2, and 3, the transport section 15 includes a pair of chains 52 and a gripper 54. The gripper 54 is an example of a holder that holds a leading end portion of a recording medium P. FIG. 1 illustrates the chains 52 and the gripper 54 in a simplified manner.

As illustrated in FIG. 1, the pair of chains 52 are each formed in an annular shape. As illustrated in FIGS. 2 and 3, the pair of chains 52 are disposed at an interval in the apparatus depth direction (direction D in the drawings). The pair of chains 52 are respectively wound around the pair of sprockets 38 (see FIG. 2) included in the transfer body 36 and the pair of sprockets 69 (see FIG. 3) included in the pressing body 67. When the transfer body 36 having the pair of sprockets 38 and the pressing body 67 having the pair of sprockets 69 rotate, the chains 52 circulate in a circulation direction C (a direction of arrow C in FIGS. 1, 2, and 3).

As illustrated in FIGS. 2 and 3, the attachment member 55 to which the gripper 54 is attached extends across the pair of chains 52 in the apparatus depth direction. Multiple attachment members 55 are fixed to the pair of chains 52 at a predetermined interval in a circumferential direction (circulation direction C) of the chains 52.

Figure 4:
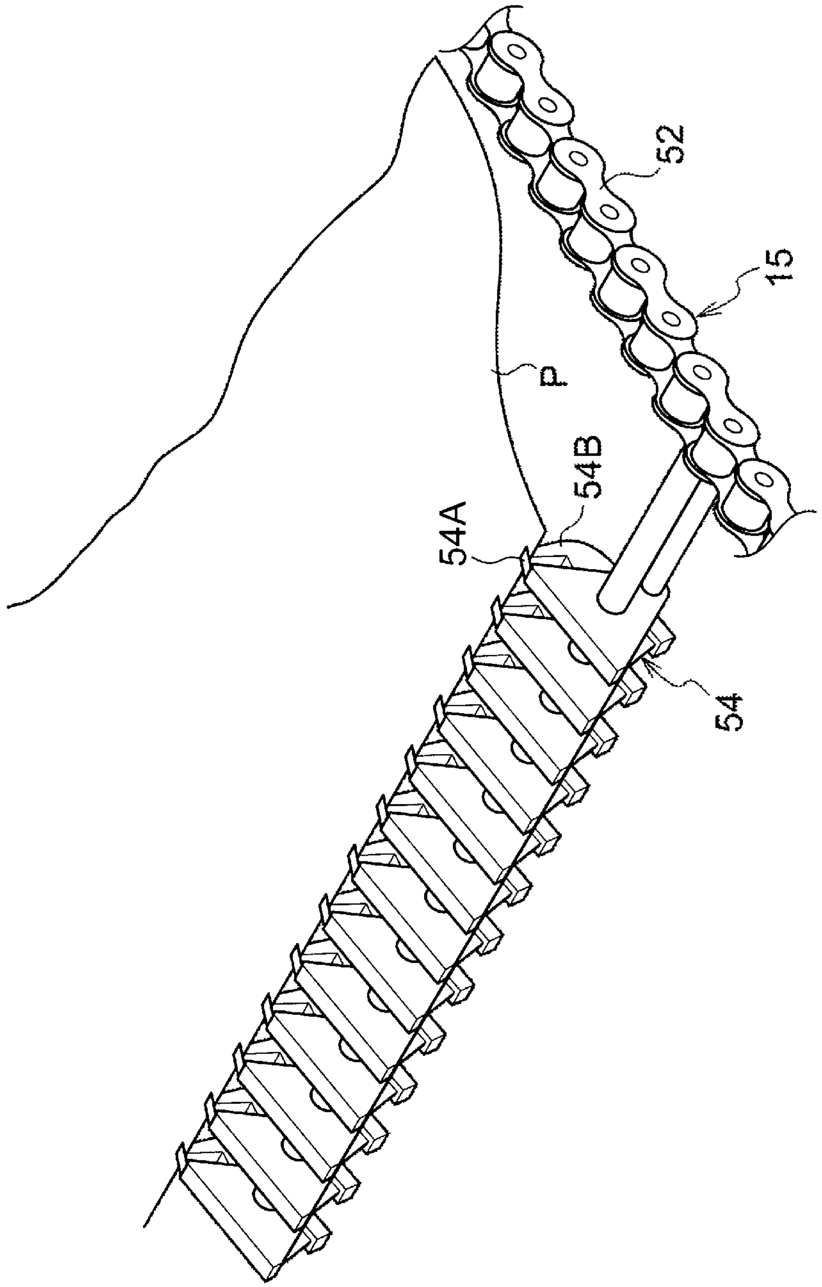
FIG. 4 is a perspective view illustrating a gripper according to the first exemplary embodiment.

As illustrated in FIGS. 2 and 3, multiple grippers 54 are attached to each of the attachment members 55 at a predetermined interval in the apparatus depth direction. In other words, the grippers 54 are attached to the chains 52 via the attachment member 55. The grippers 54 have a function of holding a leading end portion of a recording medium P. Specifically, as illustrated in FIG. 4, the grippers 54 each have a claw 54A and a claw base 54B. The gripper 54 is configured to hold a recording medium P by nipping a leading end portion of the recording medium P between the claw 54A and the claw base 54B. In other words, the gripper 54 may be also referred to as an example of a nipping portion that nips the recording medium P in a thickness direction thereof.

More specifically, the gripper 54 is disposed on a downstream side in the transport direction with respect to the recording medium P, and holds the leading end portion of the recording medium P from the downstream side in the transport direction of the recording medium P. In the gripper 54, for example, the claw 54A is pressed against the claw base 54B by a spring or the like, and the claw 54A is opened and closed with respect to the claw base 54B by the action of a cam or the like.

Then, in the transport section 15, as illustrated in FIG. 4, the gripper 54 holds the leading end portion of the recording medium P sent from a housing section (not illustrated) in which the recording medium P is housed. Further, in the transport section 15, the chains 52 circulate in the circulation direction C in a state in which the gripper 54 holds the leading end portion of the recording medium P, and hence the gripper 54 is moved to transport the recording medium P, and the recording medium P is passed through the nip region 37T together with the gripper 54 while the recording medium P is held by the gripper 54. Further, in the transport section 15, the recording medium P is transported and is passed between the heating unit 70 and the blower unit 80 together with the gripper 54 while the recording medium P is held by the gripper 54.

In the portion where the chains 52 are wound around the sprockets 38, the gripper 54 moves in a rotation direction of the transfer cylinder 37 together with the transfer cylinder 37 in a state of being housed in the recessed portion 37D of the transfer cylinder 37.

Figure 7:
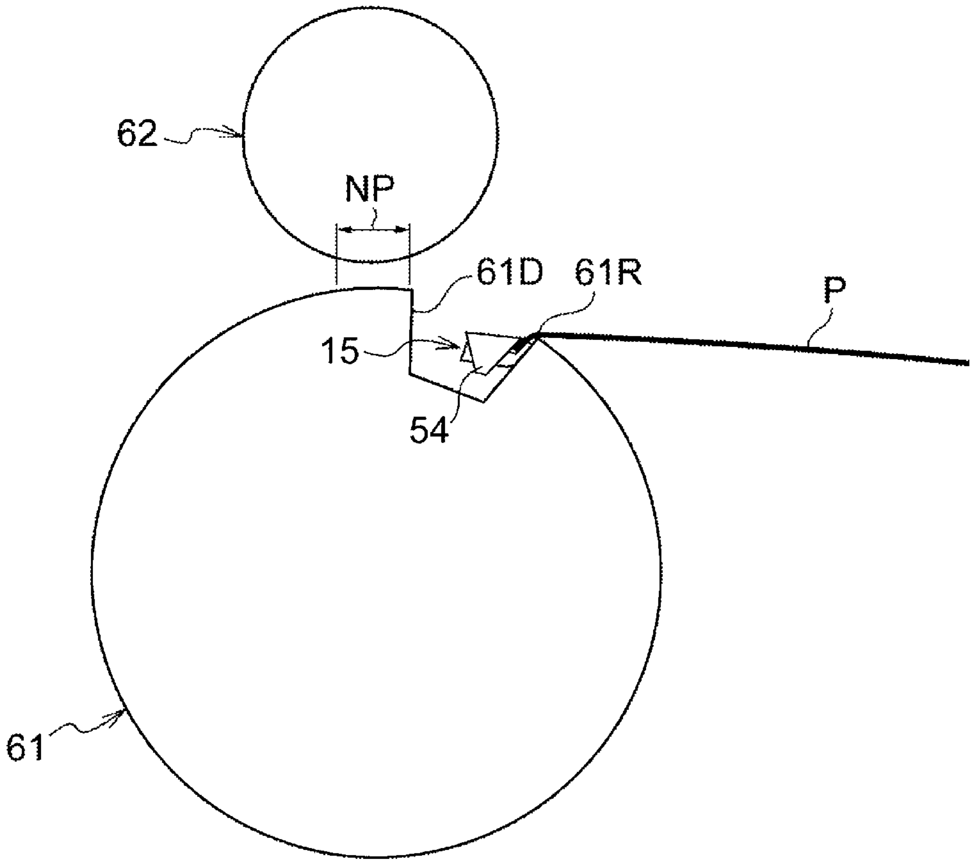
FIG. 7 is a schematic view illustrating a state in which a transport section has transported a recording medium to a position before a nip region in the configuration illustrated in FIG. 6.
Figure 8:
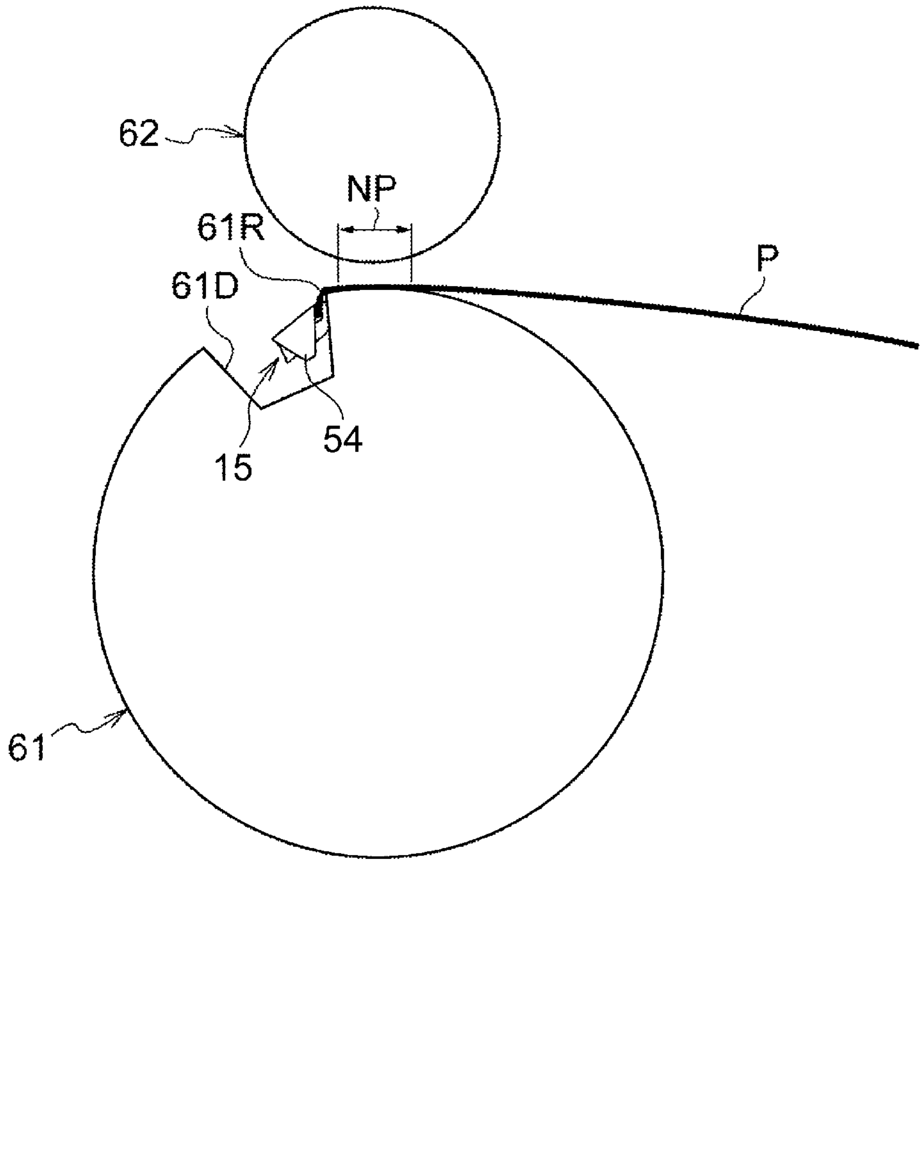
FIG. 8 is a schematic view illustrating a state in which the transport section has transported the recording medium to the nip region in the configuration illustrated in FIG. 6.

In this case, in the present exemplary embodiment, as illustrated in FIGS. 7 and 8, the transport section 15 transports the recording medium P toward the nip region NP while the gripper 54 holds the leading end portion of the recording medium P in a state in which the heating roller 62 is located at the separate position. Note that, in the portion where the chains 52 are wound around the sprockets 69, the gripper 54 moves in the rotation direction of the pressing roller 61 together with the pressing roller 61 in a state of being housed in the recessed portion 61D of the pressing roller 61. When the gripper 54 is housed in the recessed portion 61D, the recording medium P is disposed on the outer peripheral surface of the pressing roller 61 from the rear edge 61R of the pressing roller 61 toward an upstream side in the rotation direction.

Figure 9:
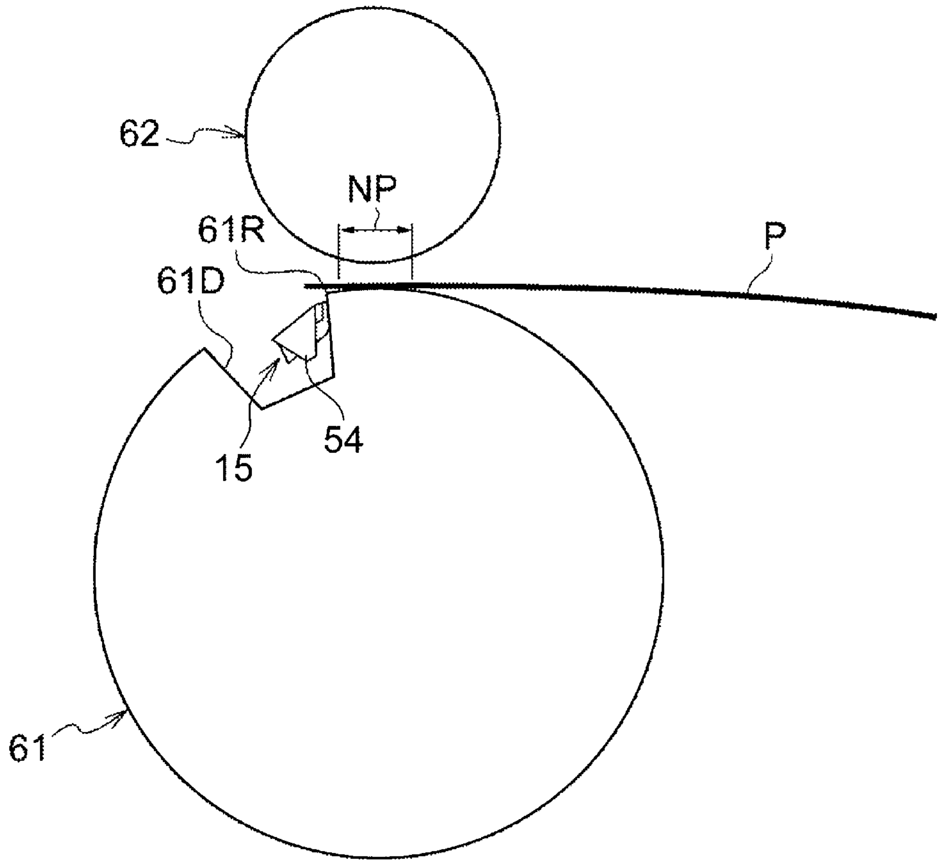
FIG. 9 is a schematic view illustrating a state in which the gripper of the transport section has released holding of a leading end portion of the recording medium in the configuration illustrated in FIG. 8.

Further, as illustrated in FIG. 9, the transport section 15 releases holding of the leading end portion of the recording medium P when the transport section 15 has transported the recording medium P to the nip region NP. That is, after the gripper 54 has passed through the nip region NP, the transport section 15 releases the holding of the leading end portion of the recording medium P. The recording medium P of which the holding of the leading end portion by the gripper 54 has been released advances in the transport direction X due to inertia. Then, the leading end portion side of the recording medium P of which the holding of the leading end portion by the gripper 54 has been released is placed on the pressing roller 61. In other words, the pressing roller 61 supports the leading end portion side of the recording medium P of which the holding of the leading end portion by the gripper 54 has been released, from the lower side. Further, the blower unit 80 (see FIG. 1) blows air toward the trailing end portion side of the recording medium P of which the holding of the leading end portion by the gripper 54 has been released, thereby supporting the recording medium P from the lower side. As described above, in the present exemplary embodiment, each of the leading end portion side and the trailing end portion side of the recording medium P of which the holding of the leading end portion by the gripper 54 has been released is supported.

Further, the state in which the pressing roller 61 in contact with the recording medium P is rotating and the state in which the chains 52 are circulating are maintained. That is, in the present exemplary embodiment, the pressing roller 61 rotates in a state in which the heating roller 62 is located at the separate position, and generates a frictional force for advancing the recording medium P of which the holding of the leading end portion by the gripper 54 has been released, to a downstream side in the transport direction.

The situation that the recording medium P has been transported to the nip region NP is detected by a detector (specifically, a sensor) on an upstream side in the transport direction of the nip region NP based on the time from when the leading edge of the recording medium P has been detected. The detection target of the detector may be the attachment member 55 or the gripper 54 instead of the leading end of the recording medium P.

As illustrated in FIG. 10, after the gripper 54 has passed through the nip region NP and after the holding of the leading end portion of the recording medium P by the gripper 54 has been released, the heating roller 62 moves from the separate position to the contact position and nips the recording medium P transported to the nip region NP by the transport section 15, with the pressing roller 61. In the present exemplary embodiment, after the gripper 54 has passed through the nip region NP and after a predetermined time has elapsed since the holding of the leading end portion of the recording medium P by the gripper 54 has been released, the heating roller 62 starts moving from the separate position and nips the recording medium P transported to the nip region NP, with the pressing roller 61. At this time, the rear edge 61R of the pressing roller 61 is also in a state in which the rear edge 61R has passed through the nip region NP. That is, after the rear edge 61R of the pressing roller 61 has also passed through the nip region NP, the heating roller 62 nips the recording medium P with the pressing roller 61.

Further, in the present exemplary embodiment, in a state in which both the heating roller 62 and the pressing roller 61 are rotating, the heating roller 62 moves from the separate position to the contact position and nips the recording medium P with the pressing roller 61. The heating roller 62 and the pressing roller 61 are configured to be driven to rotate by, for example, a driving force being transmitted to the rotation shafts thereof via transmission members such as gears. Alternatively, at least one of the heating roller 62 and the pressing roller 61 may be in contact with a driving roller different from the heating roller 62 and the pressing roller 61 and rotated, so that the heating roller 62 and the pressing roller 61 rotate independently. In this case, instead of or in addition to the heating source 62A, the heating roller 62 may be configured such that heat is transferred from a driving roller in contact with the heating roller 62. In the present exemplary embodiment, each of the heating roller 62 and the pressing roller 61 rotates at, for example, a constant velocity. That is, each of the heating roller 62 and the pressing roller 61 rotates at the same velocity, for example, before and after the holding of the leading end portion by the gripper 54 is released.

Further, the peripheral velocities of the pressing roller 61 and the heating roller 62 in the rotating state match each other. The peripheral velocities of the pressing roller 61 and the heating roller 62 do not have to be completely the same, and a difference in peripheral velocity between the pressing roller 61 and the heating roller 62 is allowed as long as a wrinkle is not generated on the recording medium P.

The heating roller 62 may start moving from the separate position before the holding of the leading end portion of the recording medium P by the gripper 54 is released, as long as the nipping of the recording medium P by the pressing roller 61 is completed after the holding of the leading end portion of the recording medium P is released.

Figure 11:
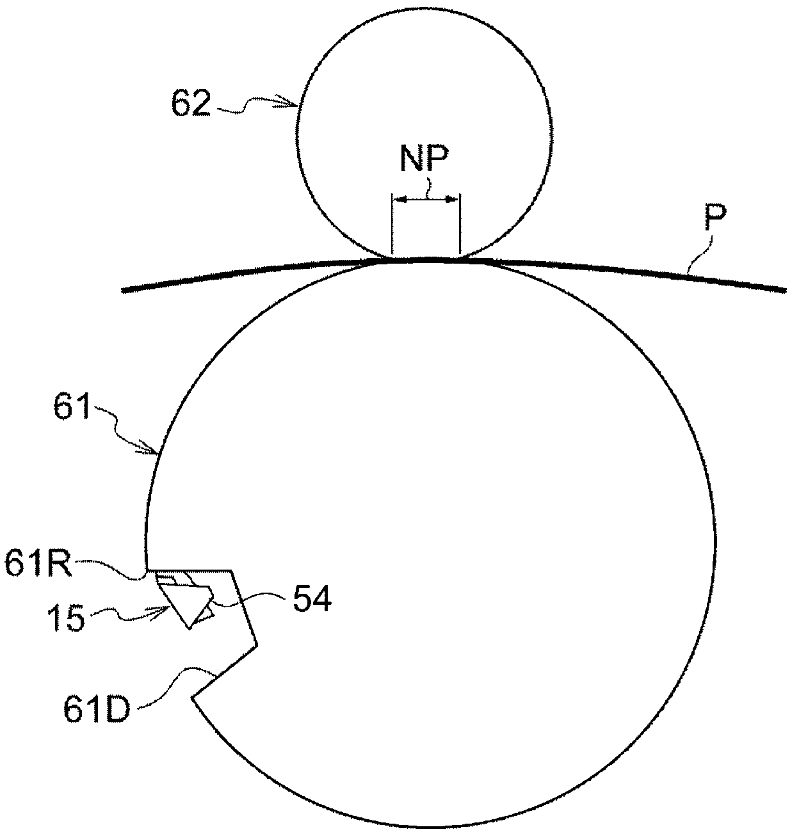
FIG. 11 is a schematic view illustrating a state in which the recording medium nipped by the heating roller and the pressing roller is transported in the configuration illustrated in FIG. 10.

Then, as illustrated in FIG. 11, in a state in which the pressing roller 61 and the heating roller 62 nip the recording medium P, the heating roller 62 starts rotating and transports the recording medium P.

In the fixing device 60, the heating roller 62 and the pressing roller 61 heat and press the recording medium P while transporting the recording medium P in the state in which the heating roller 62 and the pressing roller 61 nip the recording medium P, and hence the ink image transferred on the recording medium P is fixed to the recording medium P.

Figure 6:
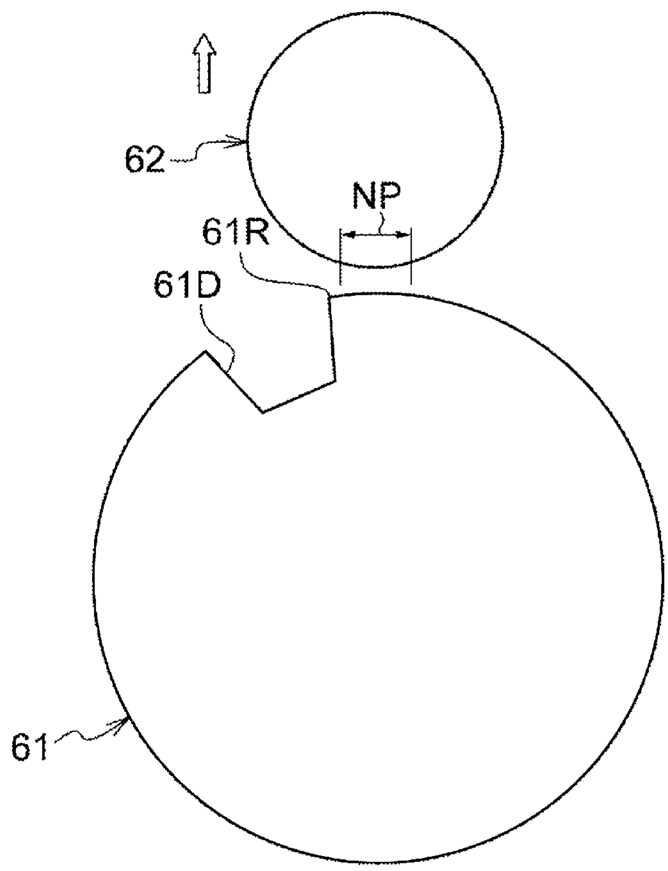
FIG. 6 is a schematic view illustrating a state in which the heating roller is located at a separate position with respect to the pressing roller in the configuration illustrated in FIG. 5.

After the heating roller 62 has transported the recording medium P, the heating roller 62 moves from the contact position (position illustrated in FIG. 5) to the separate position (position illustrated in FIG. 6). Specifically, the heating roller 62 moves from the contact position to the separate position after the transporting of the recording medium P has been completed (in other words, after the fixing of the image to the recording medium P has been completed) and before the leading edge of the recording medium P to be transported next to the nip region NP enters the nip region NP.

As described above, in the present exemplary embodiment, the heating roller 62 moves from the separate position to the contact position when nipping the recording medium P with the pressing roller 61, and moves from the contact position to the separate position when the transporting of the recording medium P has been completed. A first movement velocity at which the heating roller 62 moves from the separate position to the contact position is higher than a second movement velocity at which the heating roller 62 moves from the contact position to the separate position. That is, the heating roller 62 is moved from the separate position to the contact position by the moving mechanism at the first movement velocity higher than the second movement velocity. In other words, the movement time of the heating roller 62 from the separate position to the contact position is shorter than the movement time of the heating roller 62 from the contact position to the separate position.

In this case, the moving mechanism includes a support body that supports the heating roller 62 or a cam follower (not illustrated) provided at the heating roller 62, and a cam (not illustrated) having a small diameter portion and a large diameter portion whose length in a radial direction thereof from the rotation center is larger than that of the small diameter portion. In the moving mechanism, for example, the heating roller 62 is moved from the contact position to the separate position by coming into contact with the cam follower in a range (hereinafter, referred to as a range X) from the small diameter portion to the large diameter portion on the outer peripheral surface of the cam by rotation of the cam in a predetermined rotation direction. Further, in the moving mechanism, for example, the heating roller 62 is moved from the separate position to the contact position by coming into contact with the cam follower in a range (hereinafter, referred to as a range Y) from the large diameter portion to the small diameter portion on the outer peripheral surface of the cam by rotation of the cam in the rotation direction. In this configuration, for example, the range X is formed longer than the range Y on the outer peripheral surface of the cam, and a change in radial length from the small diameter portion to the large diameter portion in the range X is gentler than a change in radial length from the large diameter portion to the small diameter portion in the range Y. Consequently, the heating roller 62 moves from the separate position to the contact position at the first movement velocity higher than the second movement velocity.

On the outer peripheral surface of the cam, the range X and the range Y may have the same length, and a change in radial length from the small diameter portion to the large diameter portion in the range X may be the same as a change in radial length from the large diameter portion to the small diameter portion in the range Y. In this configuration, for example, the rotation velocity of the cam when the range Y comes into contact with the cam follower is set to be higher than the rotation velocity of the cam when the range X comes into contact with the cam follower, and hence the heating roller 62 moves from the separate position to the contact position at the first movement velocity higher than the second movement velocity.

Further, in the present exemplary embodiment, when the recording medium P is plain paper (that is, not coated paper), the heating roller 62 nips the recording medium P with the pressing roller 61 with a first load, and when the recording medium P is coated paper, the heating roller 62 nips the recording medium P with the pressing roller 61 with a second load larger than the first load. In the present exemplary embodiment, when the recording medium P is coated paper, the heating roller 62 nips the recording medium P with the pressing roller 61 with the second load regardless of the basis weight of the recording medium P.

In the present exemplary embodiment, for example, whether or not the recording medium P is coated paper is determined by an input by a user of the fixing device 60 or by detecting the presence or absence of a coating layer of the recording medium P using a detector such as an optical sensor. In the present exemplary embodiment, the first load or the second load is selected as the load of the heating roller 62 based on this determination.

In the present exemplary embodiment, in the case where the recording medium P is plain paper, the heating roller 62 nips the recording medium P with the pressing roller 61 with the first load when the basis weight of the recording medium P is less than a predetermined reference value, and the heating roller 62 nips the recording medium P with the pressing roller 61 with the second load when the basis weight of the recording medium P is the predetermined reference value or more.

In the present exemplary embodiment, it is determined whether or not the basis weight of the recording medium P is the reference value or more, for example, by an input by a user of the fixing device 60 or by detecting the basis weight of the recording medium P using a detector such as an ultrasonic sensor. In the present exemplary embodiment, the first load or the second load is selected as the load of the heating roller 62 based on this determination.

In the present exemplary embodiment, the moving mechanism adjusts the load of the heating roller 62 by changing the contact position with the cam follower in the small diameter portion of the cam in accordance with the rotation angle of the cam. Specifically, in the moving mechanism, the second load is generated as the load of the heating roller 62 by bringing the smallest diameter position having the smallest radial length in the small diameter portion of the cam into contact with the cam follower. Further, in the moving mechanism, the first load is generated as the load of the heating roller 62 by bringing a large diameter position having a larger radial length than the radial length at the smallest diameter position in the small diameter portion of the cam into contact with the cam follower.

In the present exemplary embodiment, the load of the heating roller 62 is not changed depending on the size of the recording medium P. Thus, in a case where the recording medium P is coated paper, the heating roller 62 nips the recording medium P with the pressing roller 61 with the second load regardless of the size of the recording medium P. In a case where the recording medium P is plain paper, when the basis weight of the recording medium P is a predetermined reference value or more, the heating roller 62 nips the recording medium P with the pressing roller 61 with the second load regardless of the size of the recording medium P. Further, in the case where the recording medium P is plain paper, when the basis weight of the recording medium P is less than the predetermined reference value, the heating roller 62 nips the recording medium P with the pressing roller 61 with the first load regardless of the size of the recording medium P. When the basis weight is the reference value or more, the thickness of the recording medium P is increased as compared with that when the basis weight of the recording medium P is less than the predetermined reference value. The heating roller 62 comes into contact with the recording medium P faster by the difference in thickness of the recording medium P. Accordingly, although the time for addressing a cockle or the like caused by the recording medium P being restrained by the gripper 54 is shortened, a wrinkle is less likely to be generated on the recording medium P having a large thickness, and thus the influence of that the heating roller 62 comes into contact with the recording medium P faster is small.

At least one of the pressing roller 61 and the heating roller 62 is formed of an elastic body that is elastically deformed by a load generated when the heating roller 62 and the pressing roller 61 nip the recording medium P. In the present exemplary embodiment, both the pressing roller 61 and the heating roller 62 are each formed of, for example, a rubber roller (an example of an elastic body) having a rubber layer on the outer periphery of a roller.

Operations of Present Exemplary Embodiment

In the image forming apparatus 10, as illustrated in FIG. 1, the adhesive-layer forming device 24 forms an adhesive layer (not illustrated) by applying an adhesive to the outer peripheral surface of the circulating transfer belt 31. Then, the particle supply device 18 supplies the ink receptive particles 16 to the transfer belt 31, and hence an ink-receptive-particle layer 16A is formed on the adhesive layer of the transfer belt 31.

Then, the ejection head 20 ejects ink droplets onto the ink-receptive-particle layer 16A to form an ink image. The ink image formed on the ink-receptive-particle layer 16A is transported to the nip region 37T by the circulating of the transfer belt 31, and the recording medium P is transported to the nip region 37T by the transport section 15.

The transfer body 36 transfers the ink image onto the recording medium P by nipping and pressing the recording medium P transported to the nip region 37T and the ink image, with the transfer belt 31.

As illustrated in FIGS. 7 and 8, the recording medium P with the ink transferred is transported to the nip region NP by the transport section 15 while the leading end portion of the recording medium P is held by the gripper 54 in the state in which the heating roller 62 is located at the separate position. Then, as illustrated in FIG. 9, the holding of the leading end portion of the recording medium P by the gripper 54 is released. Specifically, after the gripper 54 has passed through the nip region NP, the holding of the leading end portion of the recording medium P is released.

Then, as illustrated in FIG. 10, after the gripper 54 has passed through the nip region NP and after the holding of the leading end portion of the recording medium P by the gripper 54 has been released, the heating roller 62 moves from the separate position to the contact position and nips the recording medium P transported to the nip region NP by the transport section 15, with the pressing roller 61. Then, as illustrated in FIG. 11, in a state in which the pressing roller 61 and the heating roller 62 nip the recording medium P, the heating roller 62 starts rotating and transports the recording medium P.

The heating roller 62 and the pressing roller 61 heat and press the recording medium P while transporting the recording medium P in the state in which the heating roller 62 and the pressing roller 61 nip the recording medium P, and hence the ink image transferred to the recording medium P is fixed to the recording medium P.

Figure 12:
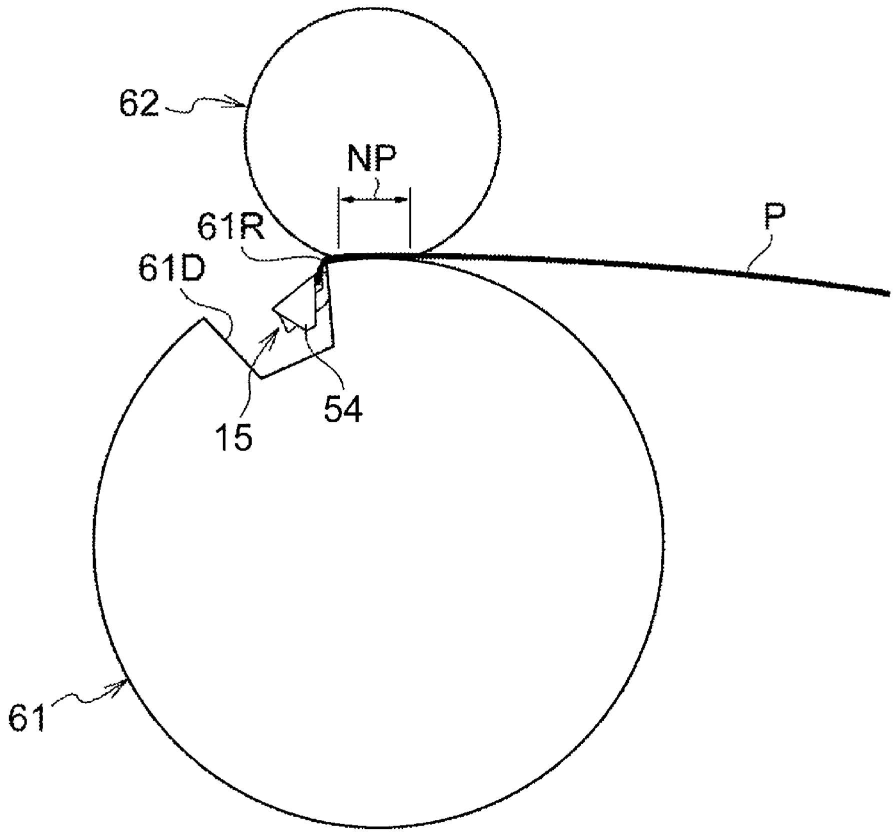
FIG. 12 is a schematic view illustrating a state (comparative example) in which a heating roller and a pressing roller nip a recording medium while a gripper holds a leading end portion of the recording medium.
Figure 13:
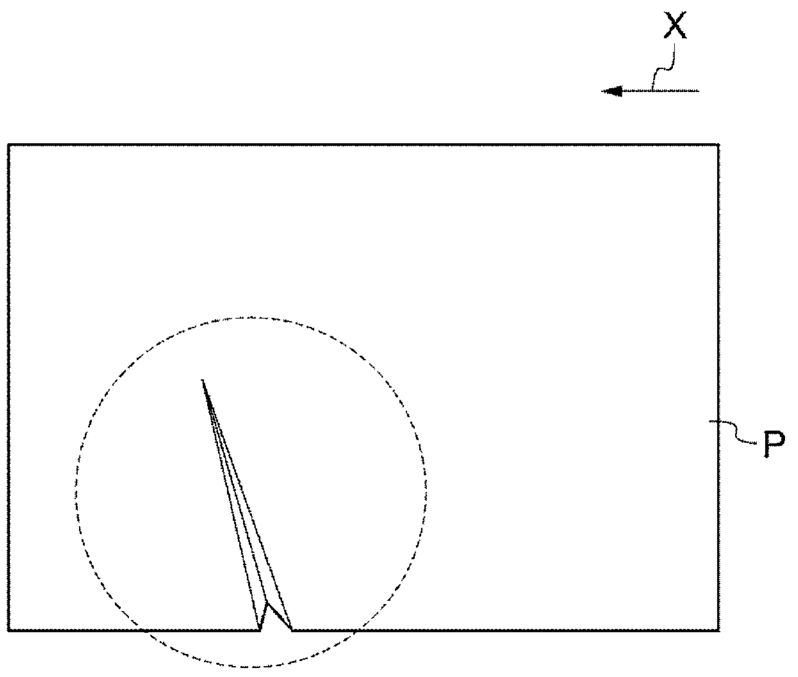
FIG. 13 is a schematic view illustrating a state in which a wrinkle is generated on the recording medium transported in the configuration illustrated in FIG. 12.

In this case, as illustrated in FIG. 12, in a configuration (hereinafter, referred to as a "first configuration") in which the pressing roller 61 and the heating roller 62 nip and transport the recording medium P in a state in which the gripper 54 holds the leading end portion of the recording medium P transported to the nip region NP, the leading end portion is held by the gripper 54, and thus the posture of the recording medium P is restrained. For example, in a case where the recording medium P is transported to the nip region NP in a cockling state or in a state of being inclined with respect to the transport direction X, since the recording medium P is nipped by the pressing roller 61 and the heating roller 62 in this state, a wrinkle may be generated on the recording medium P as illustrated in FIG. 13. In particular, when the recording medium P is thin paper, a wrinkle is likely to be generated.

In contrast, in the present exemplary embodiment, as described above, since the recording medium P is nipped by the heating roller 62 and the pressing roller 61 after the holding of the leading end portion of the recording medium P by the gripper 54 has been released, the recording medium P is not restrained to the posture of when being transported to the nip region NP. Accordingly, for example, even in a case where the recording medium P is transported to the nip region NP in a cockling state or a state of being inclined with respect to the transport direction X, the state of the recording medium P may be addressed. Thus, according to the configuration of the present exemplary embodiment, generation of a wrinkle on the recording medium P is suppressed as compared with the first configuration.

In the present exemplary embodiment, after the gripper 54 has passed through the nip region NP, the heating roller 62 moves from the separate position to the contact position and nips the recording medium P with the pressing roller 61. Accordingly, as compared with a configuration in which the heating roller 62 moves from the separate position to the contact position before the gripper 54 passes through the nip region NP, contact between the gripper 54 and the heating roller 62 is suppressed.

Moreover, in the present exemplary embodiment, the transport section 15 transports the recording medium P to the nip region NP while the gripper 54 holds the leading end portion of the recording medium P in a state in which the heating roller 62 is located at the separate position.

Accordingly, as compared with a configuration in which the recording medium P is nipped by the heating roller 62 and the pressing roller 61 after the holding of the leading end portion by the gripper 54 has been released in front of the nip region NP and after the recording medium P has been transported to the nip region NP by another transport section, the time from when the holding of the leading end portion of the recording medium P has been released to when the recording medium P is nipped by the heating roller 62 and the pressing roller 61 is short. As described above, since the time of the free state in which the recording medium P is not restrained is short, for example, the inclination of the posture due to the external force acting in the free state is suppressed. Consequently, defective nipping of the recording medium P by the heating roller 62 and the pressing roller 61 is suppressed, and generation of a wrinkle on the recording medium P is suppressed.

Moreover, in the present exemplary embodiment, the pressing roller 61 rotates in a state in which the heating roller 62 is located at the separate position, and generates a frictional force for advancing the recording medium P of which the holding of the leading end portion of the recording medium P by the gripper 54 has been released, to the downstream side in the transport direction. Accordingly, as compared with a configuration in which the pressing roller 61 is in contact with the recording medium P of which the holding of the leading end portion by the gripper 54 has been released in a non-rotating state, the recording medium P of which the holding of the leading end portion by the gripper 54 has been released is prevented from moving back toward the upstream side in the transport direction. As described above, since the recording medium P of which the holding of the leading end portion by the gripper 54 has been released is prevented from moving back toward the upstream side in the transport direction, the position at which fixing of an image to the recording medium P is started is prevented from varying among the recording media P.

Further, in the present exemplary embodiment, the pressing roller 61 supports the leading end portion side of the recording medium P of which the holding of the leading end portion by the gripper 54 has been released, from the lower side. Further, the blower unit 80 blows air to the trailing end portion side of the recording medium P of which the holding of the leading end portion by the gripper 54 has been released, thereby supporting the recording medium P from the lower side. Accordingly, as compared with a configuration in which only the leading end portion side of the recording medium P is supported, hanging down of the trailing end portion side of the recording medium P of which the holding of the leading end portion by the gripper 54 has been released is suppressed.

Moreover, in the present exemplary embodiment, after the gripper 54 has passed through the nip region NP and after a predetermined time has elapsed since the holding of the leading end portion of the recording medium P by the gripper 54 has been released, the heating roller 62 starts moving from the separate position and nips the recording medium P transported to the nip region NP, with the pressing roller 61. Accordingly, as compared with a configuration in which the heating roller 62 nips the recording medium P with the pressing roller 61 at the same time as the holding of the leading end portion of the recording medium P by the gripper 54 is released, the time for addressing a cockle or the like caused by the recording medium P being restrained by the gripper 54 is ensured. Consequently, since the heating roller 62 nips the recording medium P with the pressing roller 61 after a cockle or the like of the recording medium P has been addressed, generation of a wrinkle on the recording medium P is suppressed.

Further, in the present exemplary embodiment, in a state in which both the heating roller 62 and the pressing roller 61 are rotating, the heating roller 62 moves from the separate position to the contact position and nips the recording medium P with the pressing roller 61. In this case, in a configuration in which the heating roller 62 nips the recording medium P with the pressing roller 61 in a state in which only one of the heating roller 62 and the pressing roller 61 is rotating (hereinafter, referred to as a first configuration), since a transport force is applied to one surface of the recording medium P and a brake acts on the other surface, a wrinkle is likely to be generated on the recording medium P.

In contrast, in the present exemplary embodiment, in the state in which both the heating roller 62 and the pressing roller 61 are rotating, the heating roller 62 nips the recording medium P with the pressing roller 61, and thus generation of a wrinkle on the recording medium P is suppressed as compared with the first configuration.

In the present exemplary embodiment, the peripheral velocities of the pressing roller 61 and the heating roller 62 in the rotating state match each other. Accordingly, the transport forces acting on one surface and the other surface of the recording medium P match each other. Consequently, generation of a wrinkle on the recording medium P is suppressed as compared with a configuration in which the peripheral velocities of the pressing roller 61 and the heating roller 62 in the rotating state are different (hereinafter, referred to as a second configuration). Note that the second configuration is a configuration in which the peripheral velocities of the pressing roller 61 and the heating roller 62 in the rotating state are different to such an extent that a wrinkle is generated on the recording medium P.

In the present exemplary embodiment, the first movement velocity at which the heating roller 62 moves from the separate position to the contact position is higher than the second movement velocity at which the heating roller 62 moves from the contact position to the separate position. Accordingly, for example, even in a case where the heating roller 62 is inclined with respect to the pressing roller 61 and there is a deviation in the contact timing at which one end portion and the other end portion of the heating roller 62 in an axial direction thereof contact the recording medium P, the deviation is small as compared with a configuration in which the first movement velocity is the same velocity as the second movement velocity. Consequently, the time during which the load acts unevenly on one side of the recording medium P is reduced, and generation of a wrinkle on the recording medium P is suppressed.

Further, in the present exemplary embodiment, since the second movement velocity is lower than the first movement velocity, in the range X from the small diameter portion to the large diameter portion on the outer peripheral surface of the cam, a change in radial length from the small diameter portion to the large diameter portion is gentler than that in the range Y from the large diameter portion to the small diameter portion on the outer peripheral surface of the cam. Accordingly, when the heating roller 62 is moved from the contact position to the separate position, noise due to contact between the cam and the cam follower is suppressed.

Moreover, in the present exemplary embodiment, both the pressing roller 61 and the heating roller 62 are each formed of, for example, a rubber roller (an example of an elastic body) having a rubber layer on the outer periphery of a roller. Accordingly, as compared with a configuration in which both the pressing roller 61 and the heating roller 62 are rigid bodies that are not elastically deformed, an impact generated when the heating roller 62 nips the recording medium P with the pressing roller 61 is absorbed.

Moreover, in the present exemplary embodiment, when the recording medium P is plain paper, the heating roller 62 nips the recording medium P with the pressing roller 61 with the first load, and when the recording medium P is coated paper, the heating roller 62 nips the recording medium P with the pressing roller 61 with the second load larger than the first load. Accordingly, in a case where the recording medium P is coated paper, the amount of heat applied to the recording medium P increases and the gloss of the recording medium P is improved as compared with a configuration in which the heating roller 62 nips the recording medium P with the pressing roller 61 with the first load.

In the present exemplary embodiment, in the case where the recording medium P is plain paper, the heating roller 62 nips the recording medium P with the pressing roller 61 with the first load when the basis weight of the recording medium P is less than a predetermined reference value, and the heating roller 62 nips the recording medium P with the pressing roller 61 with the second load when the basis weight of the recording medium P is the predetermined reference value or more. Accordingly, in a case where the basis weight of the recording medium P is the reference value or more, the amount of heat applied to the recording medium P increases and defective fixing of the recording medium P is suppressed as compared with a configuration in which the heating roller 62 nips the recording medium P with the pressing roller 61 with the first load.

Figure 14:
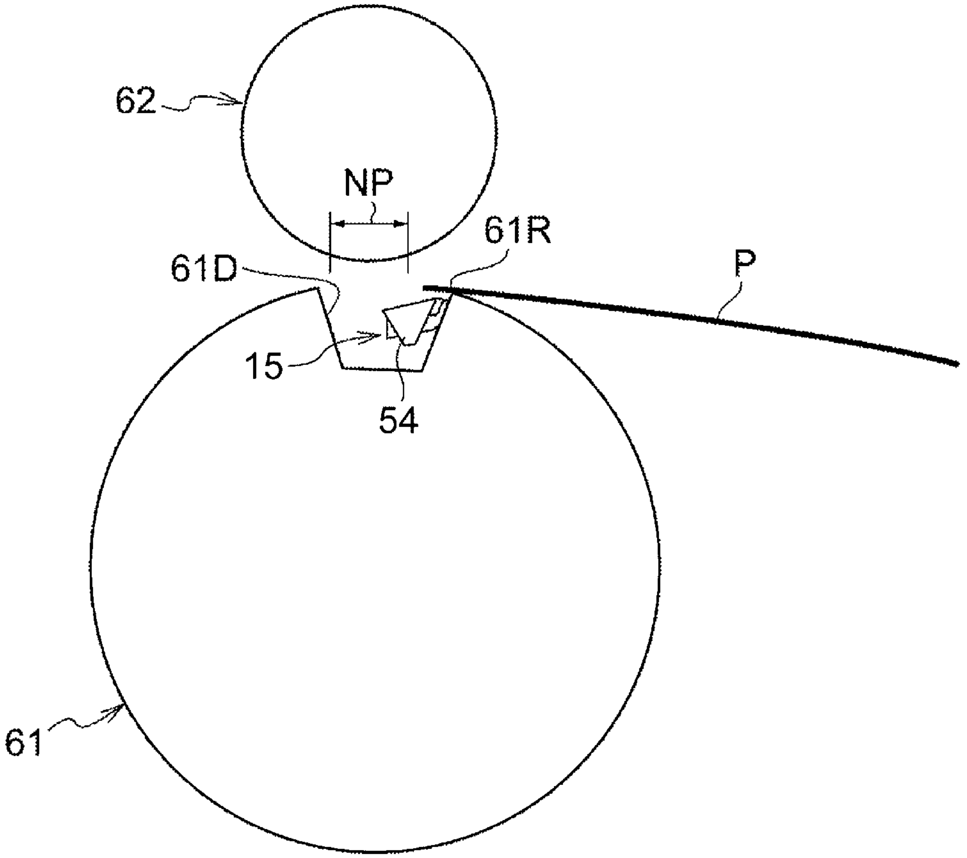
FIG. 14 is a schematic view illustrating a modification in which a gripper releases holding of a leading end portion of a recording medium before a nip region.

Modification of Timing at Which Gripper 54 Releases Holding of Leading End Portion of Recording Medium P In the above-described exemplary embodiment, the gripper 54 releases the holding of the leading end portion of the recording medium P after the gripper 54 has passed through the nip region NP; however, it is not limited thereto. In the present modification, the transport section 15 transports the recording medium P toward the nip region NP while the gripper 54 holds the leading end portion of the recording medium P in a state in which the heating roller 62 is located at the separate position (see FIG. 7). As illustrated in FIG. 14, the transport section 15 releases the holding of the leading end portion of the recording medium P in front of the nip region NP of the recording medium P (that is, before the recording medium P reaches the nip region NP). Specifically, the gripper 54 releases the holding of the leading end portion of the recording medium P before passing through the nip region NP. More specifically, the holding of the leading end portion of the recording medium P is released in a state in which a portion of the gripper 54 is located in the nip region NP and another portion of the gripper 54 is located in front of the nip region NP. At this time, the state in which the pressing roller 61 is rotating and the state in which the chains 52 are circulating are maintained.

Thereafter, in the present modification, the recording medium P is attracted onto the outer peripheral surface of the pressing roller 61 and is transported to the nip region NP. That is, in the present modification, the pressing roller 61 has an attraction mechanism (not illustrated) that causes the recording medium P to be attracted to the outer peripheral surface thereof. The attraction mechanism has suction holes (not illustrated) that cause the recording medium P to be sucked to the outer peripheral surface. The attraction mechanism sucks the recording medium P through the suction holes to thereby cause the recording medium P to be attracted to the outer peripheral surface of the pressing roller 61. As described above, in the attraction mechanism, the recording medium P is attracted by using negative pressure; however, the recording medium P may be attracted by using an electrostatic force or the like.

After the gripper 54 has passed through the nip region NP, the heating roller 62 moves from the separate position to the contact position and nips the recording medium P transported to the nip region NP, with the pressing roller 61 (see FIG. 10). The heating roller 62 and the pressing roller 61 may provide the nipping after the attraction by the pressing roller 61 has been released, or may provide the nipping while the attraction by the pressing roller 61 is maintained.

Then, in a state in which the pressing roller 61 and the heating roller 62 nip the recording medium P, the heating roller 62 starts rotating and transports the recording medium P (see FIG. 11).

In the present modification, similarly to the above-described exemplary embodiment, the heating roller 62 and the pressing roller 61 heat and press the recording medium P while transporting the recording medium P in a state in which the heating roller 62 and the pressing roller 61 nip the recording medium P, and hence the ink image transferred on the recording medium P is fixed to the recording medium P.

Modification of Timing at Which Recording Medium P Is Nipped by Heating Roller 62

Figure 16:
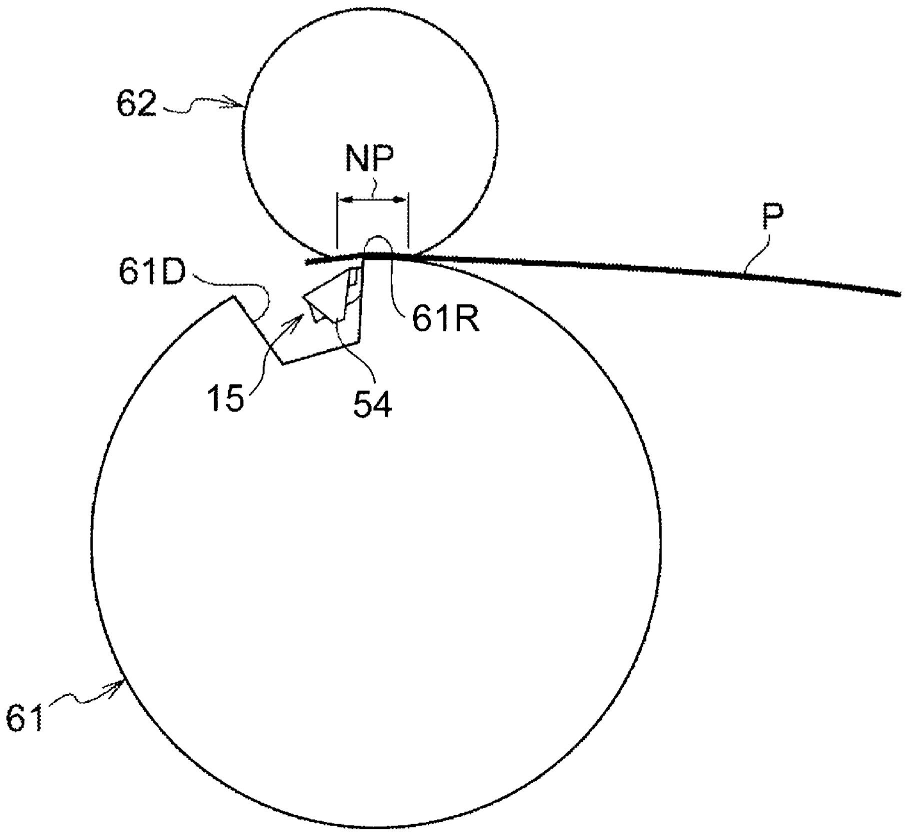
FIG. 16 is a schematic view illustrating a state in which a heating roller and a pressing roller nip a recording medium of which holding of a leading end portion has been released, in a configuration of a modification.

Further, in the present exemplary embodiment, the heating roller 62 nips the recording medium P with the pressing roller 61 after the rear edge 61R of the pressing roller 61 has also passed through the nip region NP; however, it is not limited thereto. For example, as illustrated in FIG. 16, the heating roller 62 may be configured to nip the recording medium P with the pressing roller 61 in a state in which the rear edge 61R is located in the nip region NP.

In this configuration, in a state in which the rear edge 61R is located on a downstream side in the transport direction with respect to the nip region NP, the recording medium P is nipped from the further leading end side as compared with a configuration in which the heating roller 62 nips the recording medium P with the pressing roller 61. Accordingly, even though an image is formed from the further leading end side of the recording medium P, the image may be fixed to the recording medium P. Consequently, the margin on the leading end side of the recording medium P is reduced.

Further, in the present exemplary embodiment, since the rear edge 61R is formed in a shape with a rounded corner (round shape), even if the heating roller 62 and the rear edge 61R come into contact with each other, the recording medium P is prevented from being folded at the rear edge 61R.

Modification of Transport Device

In the present exemplary embodiment, the fixing device 60 having the transport function and the fixing function is described as an example of the transport device. However, it is not limited thereto. Examples of the transport device may include a device having a function (for example, a transfer function) other than the transport function and the fixing function, and a transport device having only the transport function.

Modification of First Transport Body and Second Transport Body

In the present exemplary embodiment, the heating roller 62 is used as an example of the second transport body; however, it is not limited thereto. As an example of the second transport body, for example, the heating roller 62 and a heating belt wound around the roller may be used.

Moreover, a heating member such as a heating roller may be used as an example of the first transport body, and a pressing member such as a pressing roller and a pressing belt may be used as an example of the second transport body.

In a case where a device having the transport function and the transfer function is used as an example of the transport device, a transfer member such as a transfer roller and a counter member such as a counter roller or a counter belt facing the transfer member may be used as examples of the first transport body and the second transport body.

In a case where a transport device having only the transport function is used as an example of the transport device, a transport member such as a transport roller and a transport member such as a transport roller or a transport belt facing the transport member may be used as examples of the first transport body and the second transport body.

Modification of Transport Section

In the present exemplary embodiment, the gripper 54 disposed on the downstream side in the transport direction with respect to the recording medium P holds the leading end portion of the recording medium P from the downstream side in the transport direction of the recording medium P; however, it is not limited thereto. The gripper 54 may hold a leading end side portion of the recording medium P from both end sides (that is, lateral end sides) in a width direction of the recording medium P.

Second Exemplary Embodiment

Image Forming Apparatus 200

Figure 15:
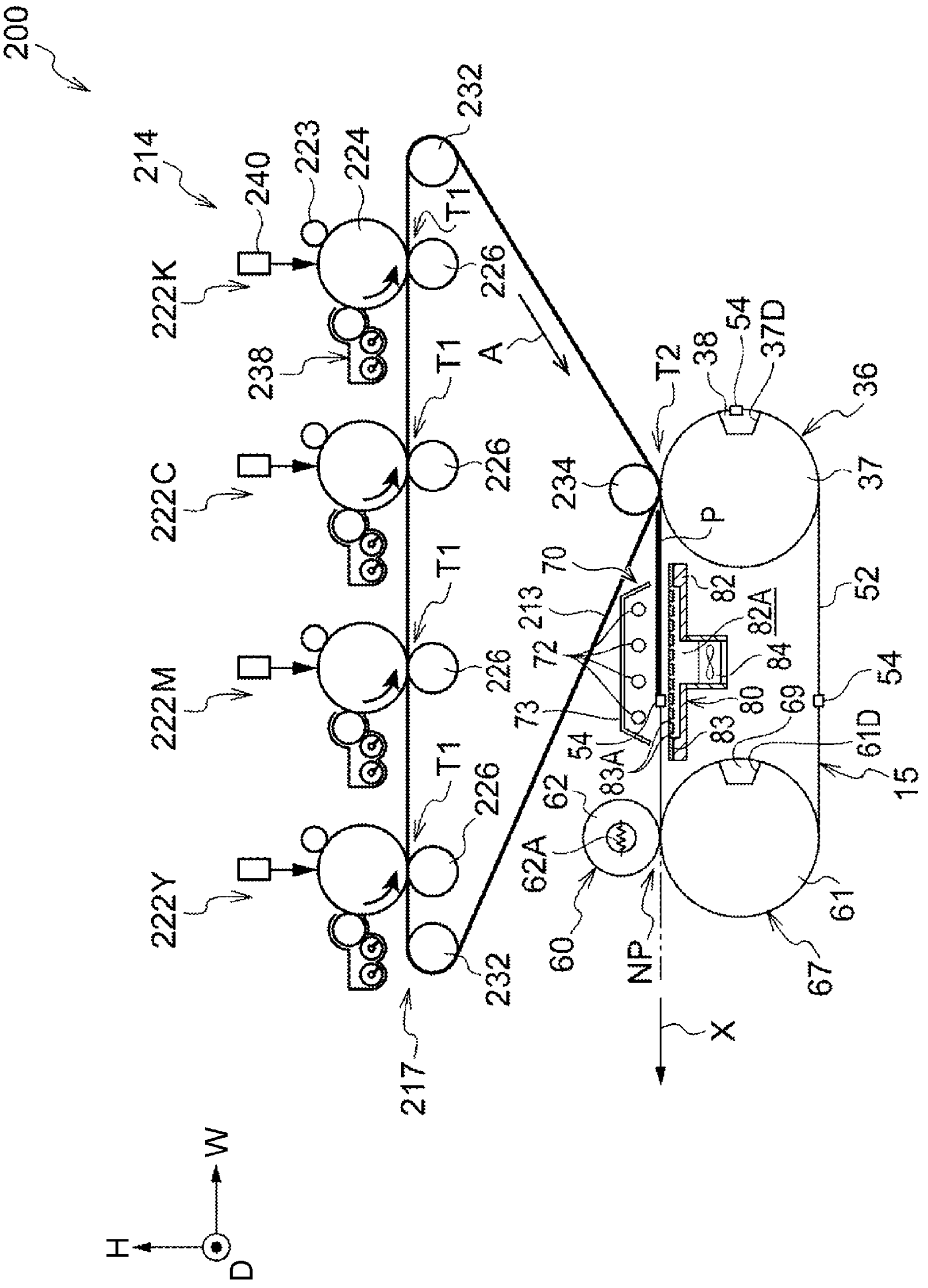
FIG. 15 is a schematic view illustrating a configuration of an image forming apparatus according to a second exemplary embodiment.

In the first exemplary embodiment, the image forming apparatus 10 is an inkjet image forming apparatus that forms an image on a recording medium P using ink. However, the image forming apparatus is not limited thereto. As an example of the image forming apparatus, an electrophotographic image forming apparatus may be used, and any apparatus that forms an image may be used. In the second exemplary embodiment, an electrophotographic image forming apparatus 200 will be described. FIG. 15 is a schematic view illustrating a configuration of the image forming apparatus 200 according to the present exemplary embodiment. Portions having the same functions as those of the first exemplary embodiment are denoted by the same reference numerals, and description thereof is omitted as appropriate.

Image Forming Section 214

The image forming apparatus 200 includes an image forming section 214 instead of the image forming section 14. The image forming section 214 is an example of an image forming section that forms an image on a recording medium. Specifically, the image forming section 214 has a function of forming a toner image (an example of an image) on a recording medium P by an electrophotographic system. More specifically, as illustrated in FIG. 15, the image forming section 214 includes a toner-image forming unit 222 that forms a toner image and a transfer device 217 that transfers the toner image formed by the toner-image forming unit 222 onto the recording medium P.

Toner-Image Forming Unit 222

Multiple toner-image forming units 222 illustrated in FIG. 15 are provided so as to form toner images for respective colors. In the present exemplary embodiment, toner-image forming units 222 of four colors in total including yellow (Y), magenta (M), cyan (C), and black (K) are provided. The reference signs Y, M, C, and K illustrated in FIG. 15 indicate components corresponding to the respective colors.

Since the toner-image forming units 222 of the respective colors have configurations similar to one another except for the toners to be used, reference numerals are given to respective components of the toner-image forming unit 222K in FIG. 15 as a representative of the toner-image forming units 222 of the respective colors.

Specifically, the toner-image forming unit 222 of each color includes a photoreceptor 224 that rotates in one direction (for example, counterclockwise direction in FIG. 15). The toner-image forming unit 222 for each color includes a charger 223, an exposure device 240, and a developing device 238.

In the toner-image forming unit 222 for each color, the charger 223 charges the photoreceptor 224. Further, the exposure device 240 exposes the photoreceptor 224 charged by the charger 223 to light to form an electrostatic latent image on the photoreceptor 224. The developing device 238 develops the electrostatic latent image formed on the photoreceptor 224 by the exposure device 240 to form a toner image.

Transfer Device 217

A transfer device 217 illustrated in FIG. 15 transfers a toner image formed by the toner-image forming unit 222 onto a recording medium P. Specifically, the transfer device 217 first transfers toner images of the photoreceptors 224 of the respective colors onto a transfer belt 213 serving as an intermediate transfer body in a superimposed manner, and second transfers the superimposed toner image onto a recording medium P. Specifically, as illustrated in FIG. 15, the transfer device 217 includes the transfer belt 213, a first transfer roller 226, and a transfer body 36.

The first transfer roller 226 is a roller that transfers the toner image of the photoreceptor 224 of each color onto the transfer belt 213 at a first transfer position T1 between the photoreceptor 224 and the first transfer roller 226. In the present exemplary embodiment, a first transfer electric field is applied between the first transfer roller 226 and the photoreceptor 224, and hence the toner image formed on the photoreceptor 224 is transferred onto the transfer belt 213 at the first transfer position T1.

The toner image is transferred from the photoreceptors 224 of the respective colors onto the outer peripheral surface of the transfer belt 213. As illustrated in FIG. 15, this transfer belt 213 has an endless shape and is wound around multiple rollers 232 and a counter roller 234 so as to have an inverted triangular posture in a front view (when viewed in the apparatus depth direction). The transfer belt 213 circulates in the direction of arrow A as at least one of the multiple rollers 232 is driven to rotate.

In the present exemplary embodiment, the transfer cylinder 37 of the transfer body 36 transfers the toner image transferred on the transfer belt 213 onto the recording medium P at the second transfer position T2 between the counter roller 234 and the transfer cylinder 37. In the present exemplary embodiment, a second transfer electric field is applied between the counter roller 234 and the transfer cylinder 37, and hence the toner image transferred on the transfer belt 213 is transferred onto the recording medium P at the second transfer position T2.

Fixing Device 60

In the present exemplary embodiment, the fixing device 60 functions as a device that fixes the toner image transferred on the recording medium P by the transfer cylinder 37 to the recording medium P.

In the fixing device 60, the heating roller 62 and the pressing roller 61 heat and press the recording medium P while transporting the recording medium P in a state in which the heating roller 62 and the pressing roller 61 nip the recording medium P, and hence the toner image transferred on the recording medium P is fixed to the recording medium P. The fixing device 60 is configured similarly to that in the first exemplary embodiment except that the toner image transferred on the recording medium P is fixed to the recording medium P.

Operations of Present Exemplary Embodiment

In the image forming apparatus 200, the toner-image forming units 222 of the respective colors form toner images. The toner images formed by the toner-image forming units 222 of the respective colors are superimposed and first transferred onto the transfer belt 213 at the each of the first transfer positions T1, and the superimposed toner image is second transferred onto the recording medium P at the second transfer position T2.

As illustrated in FIGS. 7 and 8, the recording medium P with the toner image transferred is transported to the nip region NP by the transport section 15 in a state in which a leading end portion of the recording medium P is held by the gripper 54 in a state in which the heating roller 62 is located at the separate position. Then, as illustrated in FIG. 9, the holding of the leading end portion of the recording medium P by the gripper 54 is released. Specifically, after the gripper 54 has passed through the nip region NP, the holding of the leading end portion of the recording medium P is released.

Then, as illustrated in FIG. 10, after the gripper 54 has passed through the nip region NP and after the holding of the leading end portion of the recording medium P by the gripper 54 has been released, the heating roller 62 moves from the separate position to the contact position and nips the recording medium P transported to the nip region NP by the transport section 15, with the pressing roller 61. Then, as illustrated in FIG. 11, in a state in which the pressing roller 61 and the heating roller 62 nip the recording medium P, the heating roller 62 starts rotating and transports the recording medium P.

The heating roller 62 and the pressing roller 61 heat and press the recording medium P while transporting the recording medium P in a state in which the heating roller 62 and the pressing roller 61 nip the recording medium P, and hence the toner image transferred to the recording medium P is fixed to the recording medium P.

As described above, since the recording medium P is nipped by the heating roller 62 and the pressing roller 61 after the holding of the leading end portion of the recording medium P by the gripper 54 has been released, the recording medium P is not restrained to the posture of when being transported to the nip region NP. Accordingly, for example, even in a case where the recording medium P is transported to the nip region NP in a cockling state or a state of being inclined with respect to the transport direction X, the state of the recording medium P may be addressed. Thus, according to the configuration of the present exemplary embodiment, generation of a wrinkle on the recording medium P is suppressed as compared with the first configuration. As described above, the present exemplary embodiment also has operations similar to those of the above-described first exemplary embodiment.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

For example, multiple ones of the above-described modifications may be combined as appropriate. Further, a member in the exemplary embodiment may be a single body or may be combined with a peripheral member.

What is claimed is:

1. A transport device comprising:

a first transport body;

a second transport body that is movable between a contact position and a separate position with respect to the first transport body and that nips a transported material with the first transport body at the contact position; and a transport section that includes a holder to hold a leading end portion of the transported material and that transports the transported material toward a nip region where the first transport body and the second transport body nip the transported material in a state in which the second transport body is located at the separate position, wherein, the second transport body is arranged on a side of a surface having an unfixed image transferred to the transported material, after holding of the leading end portion by the holder for the transported material transported by the transport section has been released in a state where the transported material is restored from having a cockle, the second transport body nips the transported material with the first transport body and transports the transported material.

2. The transport device according to claim 1, wherein, after the holder has passed through the nip region and after the holding of the leading end portion by the holder has been released, the second transport body moves from the separate position to the contact position, nips the transported material with the first transport body, and transports the transported material.

3. The transport device according to claim 2, wherein the transport section transports the transported material to the nip region while the holder holds the leading end portion in the state in which the second transport body is located at the separate position, and wherein, after the holder has passed through the nip region and after the holding of the leading end portion by the holder has been released, the second transport body moves from the separate position to the contact position, nips the transported material transported to the nip region by the transport section with the first transport body, and transports the transported material.

4. The transport device according to claim 1, wherein the second transport body comes into contact with the transported material of which the holding of the leading end portion by the holder is to be released in a state in which the first transport body is rotating.

5. The transport device according to claim 2, wherein the second transport body comes into contact with the transported material of which the holding of the leading end portion by the holder is to be released in a state in which the first transport body is rotating.

6. The transport device according to claim 3, wherein the second transport body comes into contact with the transported material of which the holding of the leading end portion by the holder is to be released in a state in which the first transport body is rotating.

7. The transport device according to claim 1, comprising:

a supporter that, when the holding of the leading end portion by the holder has been released, supports a trailing end portion side of the transported material of which a leading end portion side has been supported by the first transport body.

8. The transport device according to claim 2, comprising:

a supporter that, when the holding of the leading end portion by the holder has been released, supports a trailing end portion side of the transported material of which a leading end portion side has been supported by the first transport body.

9. The transport device according to claim 3, comprising:

a supporter that, when the holding of the leading end portion by the holder has been released, supports a trailing end portion side of the transported material of which a leading end portion side has been supported by the first transport body.

10. The transport device according to claim 4, comprising:

a supporter that, when the holding of the leading end portion by the holder has been released, supports a trailing end portion side of the transported material of which a leading end portion side has been supported by the first transport body.

11. The transport device according to claim 1, wherein, after a predetermined time has elapsed since the holding of the leading end portion by the holder has been released, the second transport body nips the transported material with the first transport body.

12. The transport device according to claim 1, wherein the first transport body includes a recessed portion in which the holder is housed, the recessed portion having a corner portion on an upstream side of a transport path, and wherein the second transport body nips the transported material with the corner portion of the first transport body.

13. The transport device according to claim 1, wherein the second transport body has a first movement velocity at which the second transport body moves from the separate position to the contact position and a second movement velocity at which the second transport body moves from the contact position to the separate position, the first movement velocity being higher than the second movement velocity.

14. The transport device according to claim 1, wherein at least one of the first transport body and the second transport body is formed of an elastic body that is elastically deformed by a load that is generated when the second transport body nips the transported material with the first transport body.

15. The transport device according to claim 1, wherein, in a rotating state in which both the first transport body and the second transport body are rotating, the second transport body nips the transported material with the first transport body.

16. The transport device according to claim 15, wherein peripheral velocities of the first transport body and the second transport body in the rotating state match each other.

17. A fixing device, wherein the fixing device serves as the transport device according to claim 1, wherein the first transport body is one of a heating member and a pressing member, and wherein the second transport body is the other of the heating member and the pressing member.

18. The fixing device according to claim 17, wherein the second transport body:

when the transported material is plain paper, nips the transported material with the first transport body with a first load; and when the transported material is coated paper, nips the transported material with the first transport body with a second load that is larger than the first load.

19. The fixing device according to claim 17, wherein the second transport body:

when the transported material has a basis weight that is less than a predetermined reference value, nips the transported material with the first transport body with a first load; and when the transported material has a basis weight that is the reference value or more, nips the transported material with the first transport body with a second load that is larger than the first load.

20. An image forming apparatus comprising:

an image forming section that forms an image on a recording medium;

a first transport body that is one of a heating member and a pressing member; and a fixing device, the fixing device including:

a second transport body that is the other of the heating member and the pressing member, that is movable between a contact position and a separate position with respect to the first transport body, and that nips the recording medium with the first transport body at the contact position; and a transport section that includes a holder to hold a leading end portion of the recording medium and that transports the recording medium while the holder holds the leading end portion, toward a nip region where the first transport body and the second transport body nip the recording medium in a state in which the second transport body is located at the separate position, wherein, the second transport body is arranged on a side of a surface having an unfixed image transferred to the recording medium, after holding of the leading end portion by the holder for the recording medium transported by the transport section has been released in a state where the recording medium is restored from having a cockle, the second transport body moves from the separate position to the contact position, nips the recording medium with the first transport body, and fixes the image formed on the recording medium by the image forming section to the recording medium, and wherein the second transport body nips the recording medium with the first transport body after a trailing end of the recording medium has passed through the image forming section.

* * * * *